United States Patent
George et al.

(10) Patent No.: US 11,544,303 B1
(45) Date of Patent: Jan. 3, 2023

(54) RESPONDING WITH UNRESPONSIVE CONTENT

(71) Applicant: Amazon Technologies, Inc., Seattle, WA (US)

(72) Inventors: Michael Martin George, Seattle, WA (US); David Garfield Uffelman, Seattle, WA (US); Deepak Maini, Seattle, WA (US); Kyle Beyer, Bainbridge Island, WA (US); Amarpaul Singh Sandhu, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 288 days.

(21) Appl. No.: 15/934,893

(22) Filed: Mar. 23, 2018

(51) Int. Cl.
| | |
|---|---|
| *G06F 16/33* | (2019.01) |
| *G06F 16/332* | (2019.01) |
| *G10L 15/22* | (2006.01) |
| *G06Q 30/02* | (2012.01) |
| *G10L 15/26* | (2006.01) |

(52) U.S. Cl.
CPC ..... *G06F 16/3329* (2019.01); *G06Q 30/0236* (2013.01); *G10L 15/22* (2013.01); *G10L 15/26* (2013.01); *G10L 2015/223* (2013.01)

(58) Field of Classification Search
CPC ... G10L 15/22; G10L 2015/223; G10L 15/26; G10L 15/30; G10L 15/1815; G10L 15/08; G10L 15/18; G06F 3/167; G06F 40/30; G06F 16/3344
See application file for complete search history.

(56) References Cited

U.S. PATENT DOCUMENTS

| | | | | |
|---|---|---|---|---|
| 6,460,036 B1 * | 10/2002 | Herz | ............... | G06Q 30/02 |
| | | | | 707/748 |
| 7,496,943 B1 * | 2/2009 | Goldberg | ......... | H04N 21/25883 |
| | | | | 705/14.5 |
| 8,131,735 B2 | 3/2012 | Rose et al. | | |
| 8,214,254 B1 * | 7/2012 | Mowry | ............. | G06Q 30/0241 |
| | | | | 705/14.1 |
| 8,321,444 B2 * | 11/2012 | Mowatt | .............. | G06F 16/951 |
| | | | | 707/763 |
| 8,364,540 B2 * | 1/2013 | Soroca | ............... | G06F 16/9577 |
| | | | | 705/14.64 |
| 8,566,152 B1 | 10/2013 | Shaw et al. | | |
| 9,229,974 B1 * | 1/2016 | Lee | .......... | G06F 16/35 |

(Continued)

OTHER PUBLICATIONS

Nicas, "Google Home tests unsolicited audio ad, to grumbles," MarketWatch, Wall Street Journal, retrieved on Feb. 20, 2020 from <<https://www.marketwatch.com/story/google-home-tests-unsolicited-audio-ad-to-grumbles-2017-03-16>>, Mar. 16, 2017, 3 pages.

(Continued)

*Primary Examiner* — Olujimi A Adesanya
(74) *Attorney, Agent, or Firm* — Lee & Hayes, P.C.

(57) ABSTRACT

This disclosure describes systems and techniques receiving a request for information from a user and, in response, outputting the requested information along with unsolicited, interesting content that is related to, yet nonresponsive to, the requested information. In some instances, if the requested information is unknown, the techniques may output an indication that the information is unknown, followed by the additional, unsolicited, interesting content.

20 Claims, 10 Drawing Sheets

(56) References Cited

U.S. PATENT DOCUMENTS

| | | | |
|---|---|---|---|
| 9,378,740 B1 | 6/2016 | Rosen et al. | |
| 9,734,839 B1* | 8/2017 | Adams | G10L 21/00 |
| 9,865,260 B1 | 1/2018 | Vuskovic et al. | |
| 10,453,101 B2 | 10/2019 | Halstvedt et al. | |
| 11,055,355 B1* | 7/2021 | Monti | G10L 15/22 |
| 2002/0116176 A1* | 8/2002 | Tsourikov | G06F 16/24522 |
| | | | 704/9 |
| 2007/0061302 A1* | 3/2007 | Ramer | G06Q 20/102 |
| 2008/0168099 A1* | 7/2008 | Skat | G06Q 30/02 |
| 2008/0256063 A1 | 10/2008 | Nasukawa et al. | |
| 2009/0006193 A1 | 1/2009 | Forbes et al. | |
| 2011/0295852 A1* | 12/2011 | Wang | G06F 16/9535 |
| | | | 707/728 |
| 2012/0173244 A1* | 7/2012 | Kwak | G10L 15/22 |
| | | | 704/E15.001 |
| 2012/0233568 A1 | 9/2012 | Martino | |
| 2012/0331390 A1* | 12/2012 | Kanjirathinkal | G06Q 10/10 |
| | | | 715/738 |
| 2013/0036127 A1 | 2/2013 | Simske et al. | |
| 2013/0110515 A1* | 5/2013 | Guzzoni | G06F 40/40 |
| | | | 704/270.1 |
| 2013/0275164 A1* | 10/2013 | Gruber | G10L 17/22 |
| | | | 705/5 |
| 2013/0346246 A1* | 12/2013 | Patel | G06Q 30/0256 |
| | | | 705/26.41 |
| 2014/0358906 A1* | 12/2014 | Behzadi | G06F 16/3322 |
| | | | 707/723 |
| 2015/0088523 A1* | 3/2015 | Schuster | G10L 15/22 |
| | | | 704/275 |
| 2015/0170653 A1* | 6/2015 | Berndt | G10L 15/22 |
| | | | 704/275 |
| 2015/0379989 A1* | 12/2015 | Balasubramanian | |
| | | | G06Q 30/0257 |
| | | | 704/233 |
| 2016/0098985 A1* | 4/2016 | Conkie | G10L 13/10 |
| | | | 704/260 |
| 2016/0180438 A1* | 6/2016 | Boston | G06Q 30/0282 |
| | | | 705/26.7 |
| 2017/0006161 A9 | 1/2017 | Riahi et al. | |
| 2017/0109784 A1 | 4/2017 | Mowry | |
| 2017/0262529 A1* | 9/2017 | Chim | G06F 16/951 |
| 2018/0307687 A1* | 10/2018 | Natkin | G06F 16/24578 |
| 2019/0066156 A1 | 2/2019 | McMichael et al. | |
| 2019/0198016 A1 | 6/2019 | McKenzie et al. | |

OTHER PUBLICATIONS

Office Action for U.S. Appl. No. 15/934,882, dated Jun. 2, 2020, George, "Responding With Unresponsive Content", 41 pages.

Office Action for U.S. Appl. No. 15/934,882, dated Nov. 25, 2020, George, "Responding With Unresponsive Content", 44 pages.

Office Action for U.S. Appl. No. 15/934,882, dated Nov. 27, 2019, George, "Responding With Unresponsive Content", 38 pages.

Blanchard, "Understanding and customizing stopword lists for enhanced patent mapping", World Patent Information, Elsevier, 2007, 29 (4), p. 308.

Office Action for U.S. Appl. No. 15/934,882, dated May 12, 2021, George, "Responding With Unresponsive Content", 46 pages.

Office Action for U.S. Appl. No. 15/934,875, dated Jul. 22, 202, George, "Responding With Unresponsive Content", 24 pages.

Southern, "Google's Year In Search: Top Queries in 2017," last accessed May 7, 2021, at https://www.searchenginejournal.com/googles-year-search-top-queries-2017/227639/, Search Engine Journal, Dec. 13, 2017, 5 pages.

Office Action for U.S. Appl. No. 15/934,875, dated Nov. 26, 2021, George, "Responding With Unresponsive Content", 24 pages.

Office Action for U.S. Appl. No. 15/934,882, dated Sep. 15, 2021, George, "Responding With Unresponsive Content", 47 pages.

Office Action for U.S. Appl. No. 15/934,875, dated Jun. 7, 2022, George, "Responding With Unresponsive Content", 39 pages.

\* cited by examiner

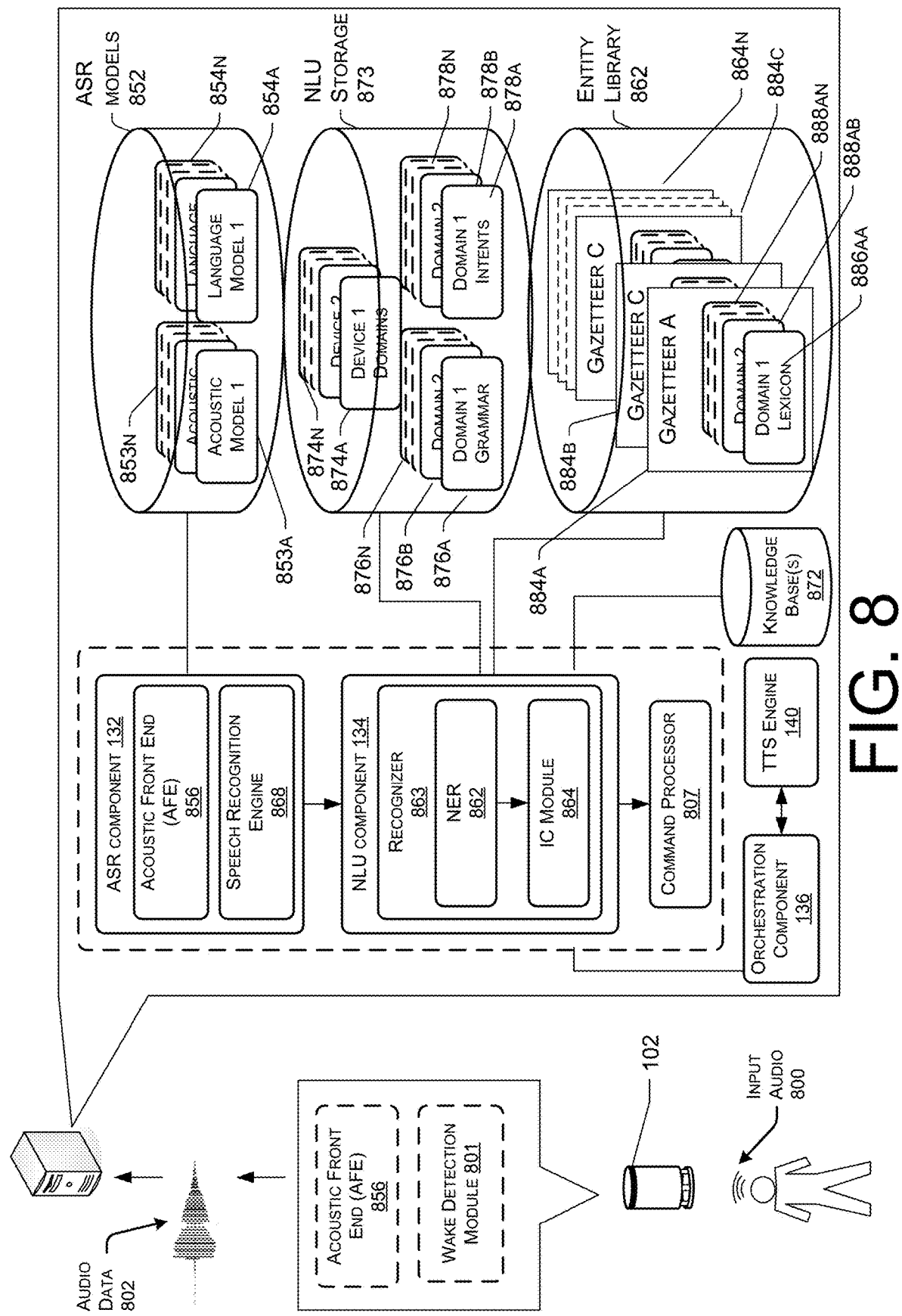

RESPONDING WITH UNRESPONSIVE CONTENT

BACKGROUND

Homes and offices are becoming more wired and connected with the proliferation of computing devices such as desktops, tablets, entertainment systems, and portable communication devices. As these computing devices evolve, many different ways have been introduced to allow users to interact with computing devices, such as through mechanical devices (e.g., keyboards, mice, etc.), touch screens, motion, and gesture. An additional way to interact with computing devices is through natural language input such as speech input and gestures. Discussed herein are technological improvements for, among other things, these computing devices and systems involving the computing devices.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 8 illustrates a conceptual diagram of components of a speech processing system for processing audio data provided by one or more devices, such as the voice-controlled device of FIG. 1.

DETAILED DESCRIPTION

Figure 1:
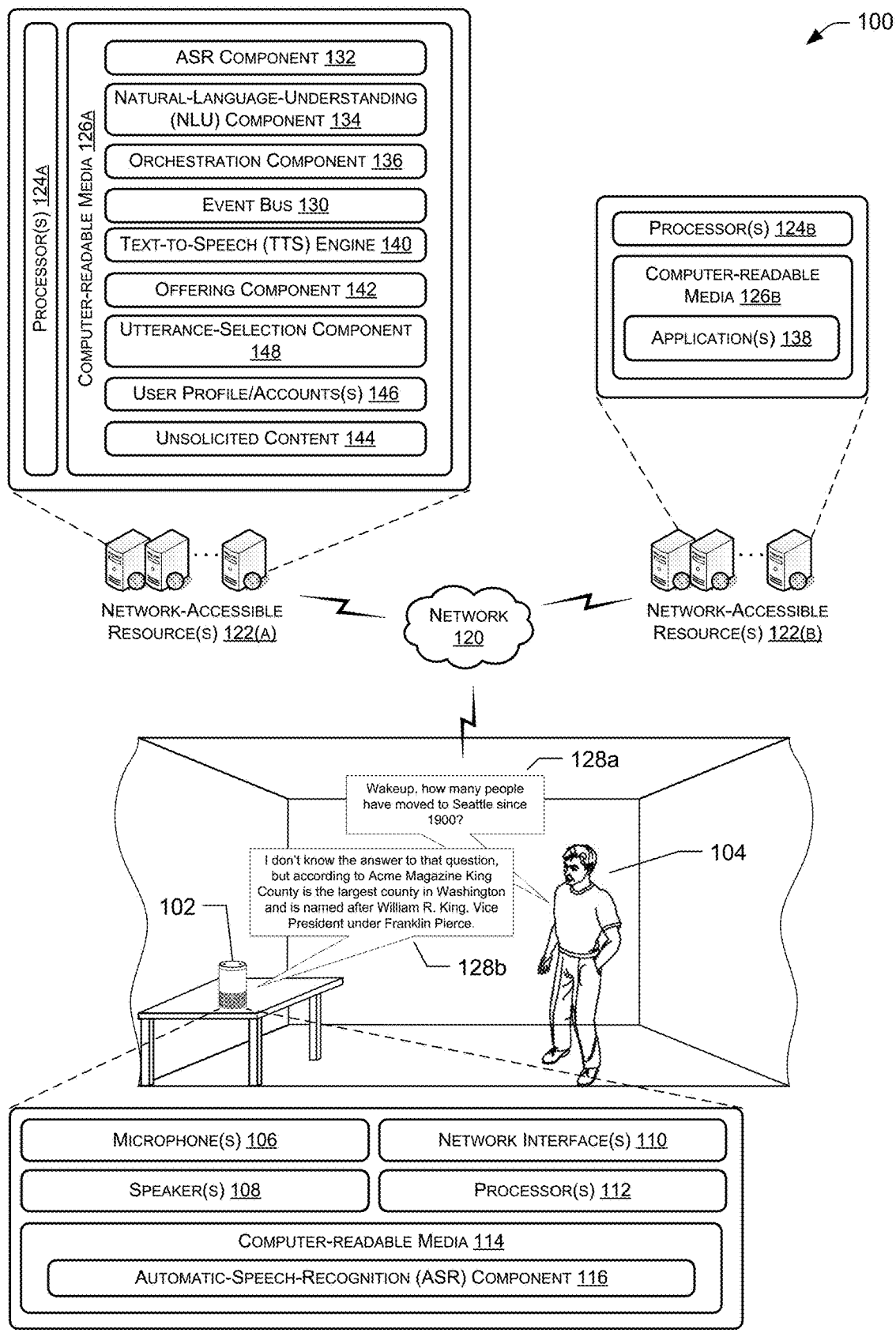
FIG. 1 illustrates an example architecture that includes network-accessible resources and a voice-controlled device configured to output unsolicited content related to a user utterance when the information requested in the user utterance is unknown. In instances where the requested information is known, the voice-controlled device may output the requested information, in addition to the unsolicited content that is related to, but different than, the requested information.

This disclosure describes systems and techniques receiving a request for information from a user and, in response, outputting the requested information along with unsolicited, interesting content that is related to but different from the requested information. In some instances, if the requested information is unknown, the techniques may output an indication that the information is unknown, followed by the additional, unsolicited, interesting content.

As described below, the requested information and the unsolicited content may be output as audio data. In other instances, either or both of the requested information or the unsolicited content may additionally or alternatively be output visually. Further, in some instances, the user request for the information may be included as part of a user utterance. As such, a user may issue an audible request for information to a voice-controlled device, which may in response audibly output the requested information along with interesting, related information. For example, if a user asks "What is the population of Washington state?", the voice-controlled device may respond "Based on 2016 census data, the population of Washington state is approximately 7.3 million people" (the requested information), followed by "According to Acme Magazine, King County is the largest county in the state and was named after William R. King, Vice President under Franklin Pierce" (the unsolicited content). In other instances, the user may utilize a graphical user interface (GUI) displayed via a web browser, a client application or the like for entering the initial query regarding the population of Washington state. In these instances, the GUI and/or audio data may be used for outputting the requested information and the additional, related information. That is, while some of the examples below are described with reference to voice commands of a user and audible outputs of a client computing device, these described techniques apply equally to GUI-based requests and responses.

In some instances, a system that provides content for output to the voice-controlled device may determine which unsolicited content to output based on user utterances and/or responses to user utterances. For example, the system may associate certain interesting facts with different entities referenced in user utterances. Entities may include places, things, people, or the like. For example, the system may, in some instances, associate certain interesting facts with the example entity "Washington" in the example above. Therefore, when a user utterance comprises a request that include the entity "Washington", the system may cause the client computing device of the requesting user to output the requested information along with one or more interesting facts associated with this entity. In addition, the system may select one or more of these interesting facts based on one or more other factors, such as information associated with the user, time of day of the request, location of the user, and/or the like.

In some instances, the system may curate corpuses of text (e.g., books, websites, etc.) to generate the interesting facts. Additionally or alternatively, the system may acquire the interesting facts from one or more sponsors of the facts (also known as "content sources" of the facts). For example, the system may offer, to one or more content sources, the opportunity to provide and/or content source the interesting facts. In the example above, for instance, the example company Acme Magazine may have provided (or at least content sourced) the interesting fact relating to Washington state. The system may offer one or more entities, user utterances, and/or responses to different content sources for providing fun facts. In some examples, a content source offering the highest value for providing content in association with a particular entity, utterance, or response may acquire the right to output the interesting fact. For example, the system may offer the entity "Washington" to multiple potential content sources, and the company offering the highest value (e.g., monetary compensation or any other types of compensation) for outputting the interesting fact along with responses to utterances that include the entity "Washington" may acquire the right to output this content. It is noted that in some instances the content source may provide the interesting fact, while in other instances the system may source the interesting facts on behalf of the content source.

In some instances, a particular entity, such as "Washington", may be associated with multiple interesting facts. In these instances, the system may utilize one or more selection criteria to select which one or more interesting facts to output in response to a given user utterance or response to a user utterance. For instance, the selection criteria may comprise information associated with the user, such as specified interests of the user, purchase history of the user, prior behavior (e.g., content items consumed, etc.) of the user, previous user interactions with the system by the user, time of day, current events, and/or the like.

Furthermore, while the above example describes associating interesting facts with entities, such as "Washington", in other instances the system may associate these facts with some or all of user utterances and/or responses. For example, the system may associate one or more facts with a user utterance of "what is the capital of Washington State?" Or, the system may associate one or more facts with certain responses to user utterances, such as the response "Olympia is the capital of Washington State".

In some instances, a user may be rewarded for receiving (and, thus, listening to or otherwise consuming) these interesting facts output as unsolicited content. For example, a user may opt-in for (e.g., indicate a preference to receive or refrain from opting out from receiving) the unsolicited content. As such, the system may store an indication in association with a profile of the user (and/or the corresponding client device) indicating that the user is to receive the interesting facts. The system and/or the content sources may reward the user for receiving these facts in any number of ways, such as in currency (paper currency, digital currency, or cryptocurrency), points to be redeemed at the system, or in any other manner. In some instances, the content sources may reward the system for outputting the interesting facts on behalf of the content sources, and the system may provide some or all of this reward to the users that receive the facts.

In some instances, meanwhile, users request information that is unknown to the system. For example, envision that a user utterance comprises "How many people have moved into Washington State since 1900?" If the system does not know the answer to this question, rather than only replying that the answer is unknown, the system may additionally output one or more interesting facts related to the utterance (e.g., related to one or more entities referenced in the utterance). In this example, for instance, the system may cause the client computing device of the user to output the following: "I do not know the answer to your question. However, according to Acme Magazine, King County is the largest county in Washington state and is named after William R. King, Vice President under Franklin Pierce." As such, while the system is unable to answer the question of the user directly, the system is able to provide interesting information that is pertinent to the initial request of the user.

FIG. 1 illustrates an example architecture 100 in which information requested by a user 104 is unknown and, thus, a voice-controlled device 102 outputs an indication that the information is unknown, as well as content that is not solicited by the user 104 but is related to the requested information (e.g., an interesting fact). While FIG. 1 illustrates a voice-controlled device 104, in other instances the architecture 100 may include one or more other computing devices configured to implement the described techniques, such as a mobile device, a television, a laptop computer, a wearable device, and/or the like.

The voice-controlled device 102 may include various computing components, such as one or more microphones 106, one or more speakers 108, one or more network interfaces 110, one or more processors 112, and computer-readable media 114. The computer-readable media 114 may store, in addition to other components, an automatic-speech-recognition (ASR) component 116 that is configured to identify a predefined user utterance (e.g., word or phrase) that, when identified, causes the device 102 to begin uploading audio data generated by the device 102 over a network 120 to a remote system. For instance, a remote system may comprise network-accessible resources 122a and/or 122b and these resources may receive the audio data from the voice-controlled device 102.

In more detail, the voice-controlled device 102 may be configured to capture audio, such as a user utterance, via the microphones 106 and generate corresponding audio data. The computer-readable media 114 of the voice-controlled device 102 may include instructions that, when executed by the one or more processors 112, may cause the one or more processors 112 to perform certain operations. For example, the operations may include sending the audio data representing a user utterance to the remote system, such as via the network 120. By way of example, the user utterance may represent a user utterance 128a requesting certain information. In this example, the user utterance 128a comprises the user stating "Wakeup, how many people have moved to Seattle since 1900?" In this example, the word "wakeup" may comprise the predefined user utterance that, when recognized by the ASR component 116, causes the device 102 to send the generated audio data to the remote resources 112a. Of course . . . push button, etc.

The remote system may comprise the network-accessible resources 122a and/or 122b (collectively 122), which in turn may comprise one or more processors 124a and/or 124b and computer-readable media 126(a) and/or 126b, potentially along with other components such as one or more network interfaces and the like. The computer-readable media 126a and/or 126b of the remote system may include one or more components, such as, for example, an event bus 130, an ASR component 132, a natural-language-understanding (NLU) component 134, an orchestration component 136, one or more applications 138, a text-to-speech (TTS) engine 140, an offering component 142, unsolicited content 144, user profiles/accounts 146, and an utterance-selection component 148. Each of these components will be described in detail below. Further, while in this example the network-accessible resources 122b are shown to include the applications 138, in other instances some or all of these applications 138 may reside in the computer-readable media 126a of the network-accessible resources 122a. Further, in some implementations the components may reside across any other number of resources 122 and in any manner.

The ASR component 132 may be configured to receive audio data from client computing devices, such as the voice-controlled device 102, after the respective client computing devices identify the predefined utterances, such as the word "wakeup". In some instances, the received audio data may represent human speech such as user utterances and the ASR component 132 may, in response to receiving the audio data, generate text data corresponding to the audio data. The text data may include words corresponding to the human speech. The NLU component 134 may be configured to determine intent data associated with the human speech based at least in part on the text data and may send the corresponding intent data to the appropriate one(s) of the application 138. For example, if the user says "Play my music", the NLU component 134 may send the intent data associated with this request to a music application. In the illustrated example, when the user 104 utters "How many people have moved to Settle since 1900?", the NLU component 134 may send this intent data to a sports-related application.

In some instances, the NLU component 134 analyzes the text data generated by the ASR component 132 to generate intent data associated with the user utterance. The intent data may indicate, in some instances, the intent of the utterance spoken by the user, such as the intent to play music, receive information about a particular topic, add an item to a grocery list, and/or the like. The generated intent data may be used to rank different ones of these potential intents to identify the best intent or domain to route the user request to. That is, after generating the intent data, the NLU component 134 may rank the applications relative to the intent data to determine which application to which to send the intent data, and hence the user request. For example, if the user utters "What time does the Seattle football team play?", the intent data associated with this request may be routed to a sports intent based on the sports intent having the highest intent score relative to intent scores associated with other intents. In some instances, however, the intent data may not be associated with an intent score that is greater than a threshold. In this example, the intent data that the NLU component 134 generates (associated with the utterance "How many people have moved to Settle since 1900?") may not be associated with an intent score that is greater than an intent score threshold. Therefore, NLU component 134 may be unable to route this intent data to any particular intent and, hence, to an associated application. Therefore, the requested information may be unknown to the system. In any event. FIG. 8 and its accompanying text describes this process in further detail below.

Because the requested information (the population growth of Seattle since 1900) is unknown, the NLU component 136, the orchestration component 136, or any component on the resources 122a and/or 122b may generate text data indicating that the answer is unknown. This text data may be routed to the TTS engine 140 for generating output audio data corresponding to this text data (e.g., "I don't know that answer to that question").

Further, and as described in detail below, the applications 138 may also include an interesting-fact application that is configured to supplement the indication that the requested information is unknown with additional, unsolicited content (and/or to supplement primary the content when the requested information is known). For instance, in the illustrated example, the NLU component or another component may determine that the requested information is unknown based on the intent score associated with the intent data being less than an intent-score threshold. Nevertheless, an interesting-facts application may identify, from the text data, the intent data, or from other information, additional information that is different than but supplements the requested information (e.g., is related to but unresponsive to). For example, the interesting-facts application or another component may identify the entity "Seattle" in the text data or the intent data and may determine that this entity is associated with one or more interesting facts. In response, the interesting-fact application may provide one or more of these interesting facts associated with the entity "Seattle" for output along with the requested information. In some instances, the interesting-facts application selects which interesting fact to output, while in other instances another component may do so. In this illustrated example, for instance, system provide the following information: "I don't know the answer to that question", while the interesting-facts application may provide the additional information: "but according to Acme Magazine, King County is the largest county in Washington and is named after William R. King, Vice President under Franklin Pierce?" In this example, the interesting-facts application may identify a fact that is most related to the requested information. For example, the application may have identified that the initial request was related to "population" and "Seattle" and, thus, the application has selected unsolicited content that is related to both topics.

In some instances, the NLU component or another component on the resource 122a provides text data indicating that the requested information is unknown to an orchestration component 136, which in turn provides this text data to the TTS engine 140 for generating first audio data for output on a client computing device in the environment of the user (or "user environment"), such as the voice-controlled device 102. In addition, the interesting-facts application may generate second text data corresponding to one or more interesting facts and may provide this second text data to the orchestration component 136, the NLU component 134, or another component. Again, the orchestration component may send this second text data to the TTS engine, which may generate second audio data for output on a client component device, such as the voice-controlled device 102. In some instances, the TTS engine 140 may generate single audio data (e.g., a single audio file) that corresponding to the first and second text data, while in other instances the TTS engine 140 may generate multiple audio data (e.g., multiple audio files) that collectively represent the first and second text data.

In either instance, the orchestration component 136 or another component, such as the TTS engine 140 may send the one or more output audio data over the network 120 to the client computing device, such as the voice-controlled device 102. Thereafter, the voice-controlled device 102 may output the audio data representing both the requested content and the additional, unsolicited content. As such, in response to the user stating "Wakeup, how many people have moved to Seattle since 1900?", the voice-controlled device 102 may respond with the following response 128b: "I don't know that answer to that question, but according to Acme Magazine, King County is the largest county in Washington and is named after William R. King, Vice President under Franklin Pierce?"

The orchestration component 136 or another component may, in some instances, determine to invoke the interesting-facts application. For example, the orchestration component 136 may analyze, from the user profile/accounts 144, that the user profile associated with the user 104 and/or the device 102 is associated with the output of the additional, unsolicited content. For instance, the user 104 may have previously opted-in, or not opted-out from, the receiving of the additional, unsolicited content from the interesting-facts application. In addition, the orchestration component may determine whether a particular user utterance 128a or the response generated by the first application is associated with unsolicited content. If so, and if the user profile indicates that the user 104 is to receive interesting facts associated with the entity of the user utterance or response, then the orchestration component 136 may invoke the interesting-facts application. For example, the orchestration component 136 may provide the first text data, the second text data provide the first application, the intent data, an indication of one or more entities referenced in any of the text data, and/or the like to the interesting-facts application. The interesting-facts application may thereafter determine one or more interesting facts to output with the requested information.

In other instances, meanwhile, the orchestration component 136 may publish (i.e., send) information to the event bus 130. The interesting-facts application may subsequently read the information published to the event bus 130 to determine whether to provide additional, unsolicited content with the requested information. For example, the orchestration component 136 may send, to the event bus 130, one or more of the text data associated with the user utterance, intent data associated with the user utterance, text data provided by the first application (e.g., the response text data in instances where a response is known and routed to an application for generating a response), one or more entities referenced in any of the previous, and/or the like. The interesting-facts application may read some or all of this information from the event bus 130 and determine whether to provide additional, unsolicited content. For instance, the interesting-facts application may read a particular entity sent by the orchestration component 136 (e.g., "Seattle". "People", etc.) and may determine whether it has one or more interesting facts that are associated with the entity. If so, then the interesting-facts application may provide text data associated with the unsolicited content to the orchestration component 136. In some instances, this unsolicited content is selected based on data stored in a profile associated with the user that requested the information, such that the interesting fact provided to the user is personalized to the user.

In some instances, the system associated with the network-accessible resources 122 may offer, to one or more content sources, the right to output content in association with user utterances and/or responses to user utterances. For instance, the offering component 142 of the resources 122a may offer, to the content sources, to acquire a right to output content associated with a respective entity referenced in a user utterance or a response to a user utterance. For instance, the offering component 142 may offer, to the content sources, the right to output additional, unsolicited content when a user utterance and/or a response to a user utterance involves the entity "Seattle," "Washington", "Fishing", "Weather", and/or the like. In some instances, the offering component 142 may select one or more content sources that offer a highest value for outputting content in association with a particular entity.

The utterance-selection component 148, meanwhile, may function to determine which user utterances and/or entities are to be output with additional, unsolicited content in addition to the requested information. For instance, the utterance-selection component 148 may use one or more selection criteria for determining which entities referenced in a user utterance or a system response to a user utterance are to be associated with pieces of unsolicited content. In some instances, the criteria may include a frequency of which the particular entity is used in user utterances or responses to user utterances. For example, the utterance-selection component 148 may determine entities that are neither rare nor common and may store an indication that these entities are available for association with interesting facts. For example, for a given entity, the utterance-selection component 148 may determine whether an amount of user utterances (or responses) that include the entity are less than a first threshold but greater than a second threshold that is less than the first threshold.

In other instances, the utterance-selection component 148 may determine entities to associate with interesting facts on a per-user basis. For example, this component 148 may determine information association with a particular user profile, such as previous user requests, purchases, interests, demographic information, geographical location, and the like, to determine entities for association with the unsolicited content. In addition, other dynamic content may be referenced for determining the entities to associate the unsolicited content to, such as current events, current weather, time of day, season, trending topics, and the like. These selected entities may be stored in association with the respective user profiles such that when they are later used in a user utterance of a user associated with the profile or in a system response to the utterance, the interesting-facts application may output one or more pieces of unsolicited content to the user.

In addition to selecting utterances and/or entities for associating unsolicited content with, the utterance-selection component 148 may determine which content to output to which users, which again may be done on a personalized basis. For instance, a particular entity, such as "Seattle", may be associated with multiple different pieces of unsolicited content, each potentially relating to a different topic (e.g., sports, music, history, weather, etc.). The utterance-selection component 148 may rank these pieces of content for determining which content to output at a given time. This ranking may be based on any of the factors described above with reference to selecting which utterances and/or entities to associate with the content, such as personalized factors (e.g., interests of a user, past behavior of a user, etc.) and other, potentially dynamic factors (e.g., current events, current weather, etc.).

As used herein, a processor, such as processor(s) 112, 124a, and 124b may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) 112, 124a, and 124b may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 112, 124a, and 124b may possess its own local memory, which also may store program components, program data, and/or one or more operating systems.

The computer-readable media 114, 126a, and 126b may include volatile and nonvolatile memory, removable and non-removable media implemented in any method or technology for storage of information, such as computer-readable instructions, data structures, program component, or other data. Such computer-readable media 114, 126a, and 126b includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The computer-readable media 114, 126a, and 126b may be implemented as computer-readable storage media ("CRSM"), which may be any available physical media accessible by the processor(s) 112, 124a, and 124b to execute instructions stored on the computer-readable media 114, 126a, and 126b. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, such as computer-readable media 114, 126a, and 126b, discussed herein may include at least one operating system (OS) component that is configured to manage hardware resource devices such as the network interface(s), the I/O devices of the respective apparatuses, and so forth, and provide various systems to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Wash., USA; the Windows operating system from Microsoft Corporation of Redmond, Wash., USA; LynxOS as promulgated by Lynx Software Technologies, Inc. of San Jose, Calif.; Operating System Embedded (Enea OSE) as promulgated by ENEA AB of Sweden; and so forth.

The network interface(s) 110, and any network interfaces forming a portion of resources 122a and/or 122b, may enable communications between the components and/or devices shown in the architecture 100 and/or with one or more other remote systems, as well as other networked devices. Such network interface(s) may include one or more network interface controllers (NICs) or other types of transceiver devices to send and receive communications over the network 120.

For instance, each of the network interface(s) may include a personal area network (PAN) component to enable communications over one or more short-range wireless communication channels. For instance, the PAN component may enable communications compliant with at least one of the following standards IEEE 802.15.4 (ZigBee), IEEE 802.15.1 (Bluetooth), IEEE 802.11 (WiFi), or any other PAN communication protocol. Furthermore, each of the network interface(s) may include a wide area network (WAN) component to enable communication over a wide area network.

In some instances, the remote system associated with the network-accessible resources 122a and 122b may be local to an environment associated the voice-controlled device 102 and/or one or more other client computing devices. For instance, some or all of the components of the resources 122a and/or 122b may be located within the device 104 and/or one or more other client computing devices. In some instances, some or all of the functionality of the network-accessible resources 122a and/or 122b may be performed by one or more of the device 104 and/or one or more of other client computing devices.

Figure 2:
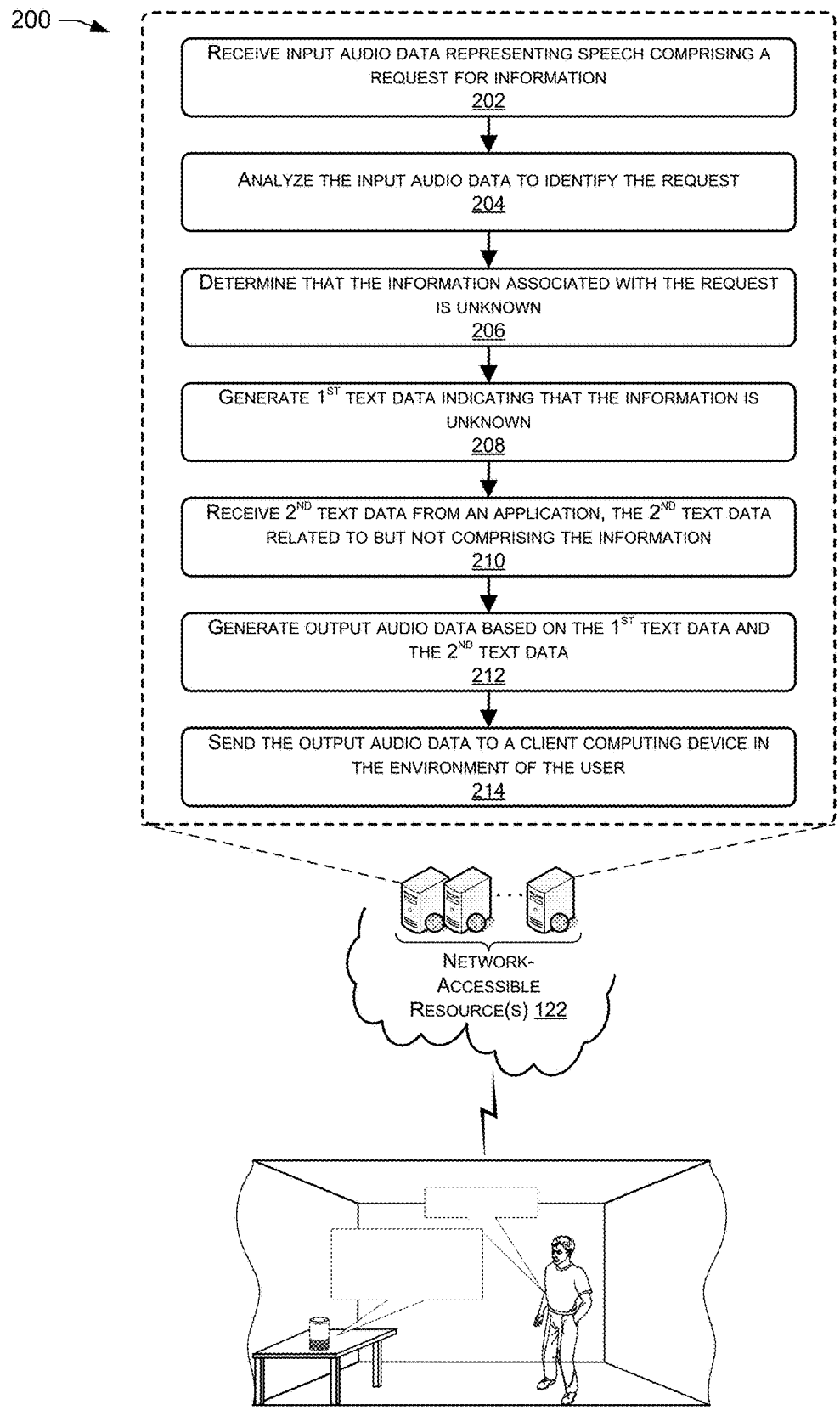
FIG. 2 illustrates a flow diagram of an example process for outputting unsolicited content related to a user utterance when the information requested in the user utterance is unknown.

FIG. 2 illustrates a flow diagram of an example process 200 that the network-accessible resources 122 may implement for causing the voice-controlled device 102, or another client computing device to output unsolicited content related to a user utterance when the information requested in the user utterance is unknown. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, although the processes may be implemented in a wide variety of other environments, architectures and systems.

At 202, the process 200 includes receiving input audio data representing speech comprising a request for information. At 204, the process 200 analyzes the input audio data to identify the request specified in the request, but determines, at 206, that the information associated with the request is unknown. For instance, envision that a user utters the speech "Wakeup, how many people have moved to Seattle since 1900?". After generating the text data corresponding to this query, an NLU component may attempt to determine the application most likely to give an appropriate or correct answer. If, however, the NLU component is unable to identify an application with a sufficient confidence level, then the NLU component may determine that the requested information is unknown. As such, at 208 the process 200 may generate first text data indicating that the information is unknown. For instance, the NLU component, the orchestration component or another component may generate the first text data.

Rather than only replying with an indication that the requested information is unknown, however, the process 200 may also respond with an unsolicited, relevant fact or facts. Therefore, at 210 the process 200 may receive second text data from an application, with the second text data being related to but different than the requested information. In some instances, upon determining that the requested information is unknown, the NLU component may invoke the application (e.g., the interesting-facts application), providing the text data corresponding to the input audio data, the generated intent data, an indication of any entities in the text data or intent data, and/or the like to the application. The application may, in response, identify (e.g., from any entities in the first text data, the intent data, or the like) unsolicited content for output. The application may then provide this second text data to the orchestration component. In another example, the orchestration component or NLU component may send, to an event bus, an indication that the response to the request is unknown, potentially along with information regarding the input audio data, the intent data, any entities referenced therein, and/or the like. In this instance, the interesting-facts application may read this information from the event bus, identify the unsolicited content for output, generate the second text data, and send the second text data to the orchestration component.

In either instance, at 212 the process 200 may generate output audio data based on the first text data and the second text data and, at 214, may send the output audio data to a client computing device for output in the environment of the user. For example, in response to a user asking the query "How many people have moved to Seattle since 1900?", the voice-controlled device may output the following: "I don't know the answer to that question" (an indication that the requested information is unknown), "but according to Acme Magazine King County is the largest county in Washington and is named after William R. King, Vice President under Franklin Pierce" (the unsolicited content).

Figure 3A:
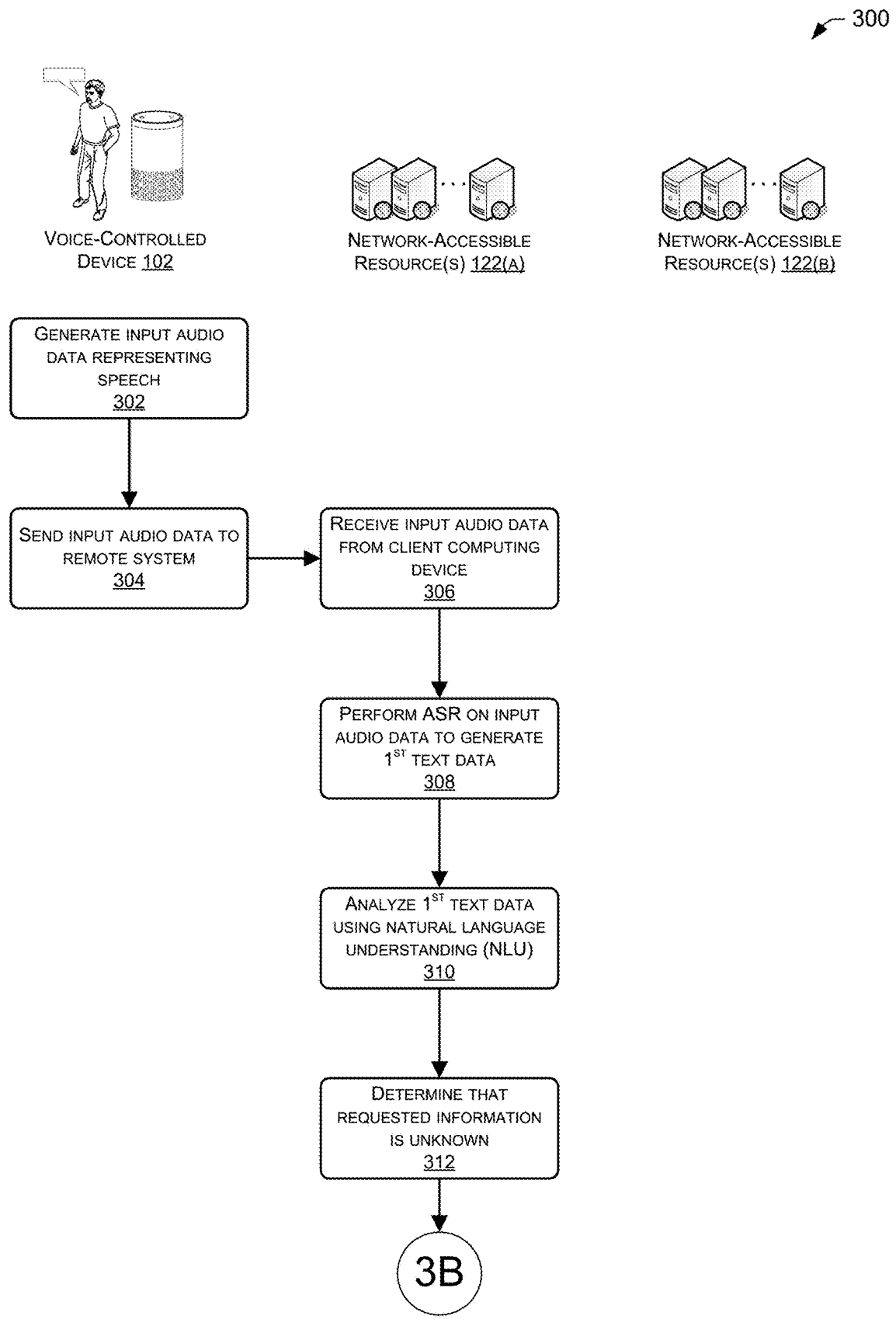
FIGS. 3A-3C collectively illustrate a flow diagram of an example process the network-accessible resources and the voice-controlled device may implement for outputting supplemental content that is unresponsive, but related to, requested information when the requested information is unknown.
Figure 3B:
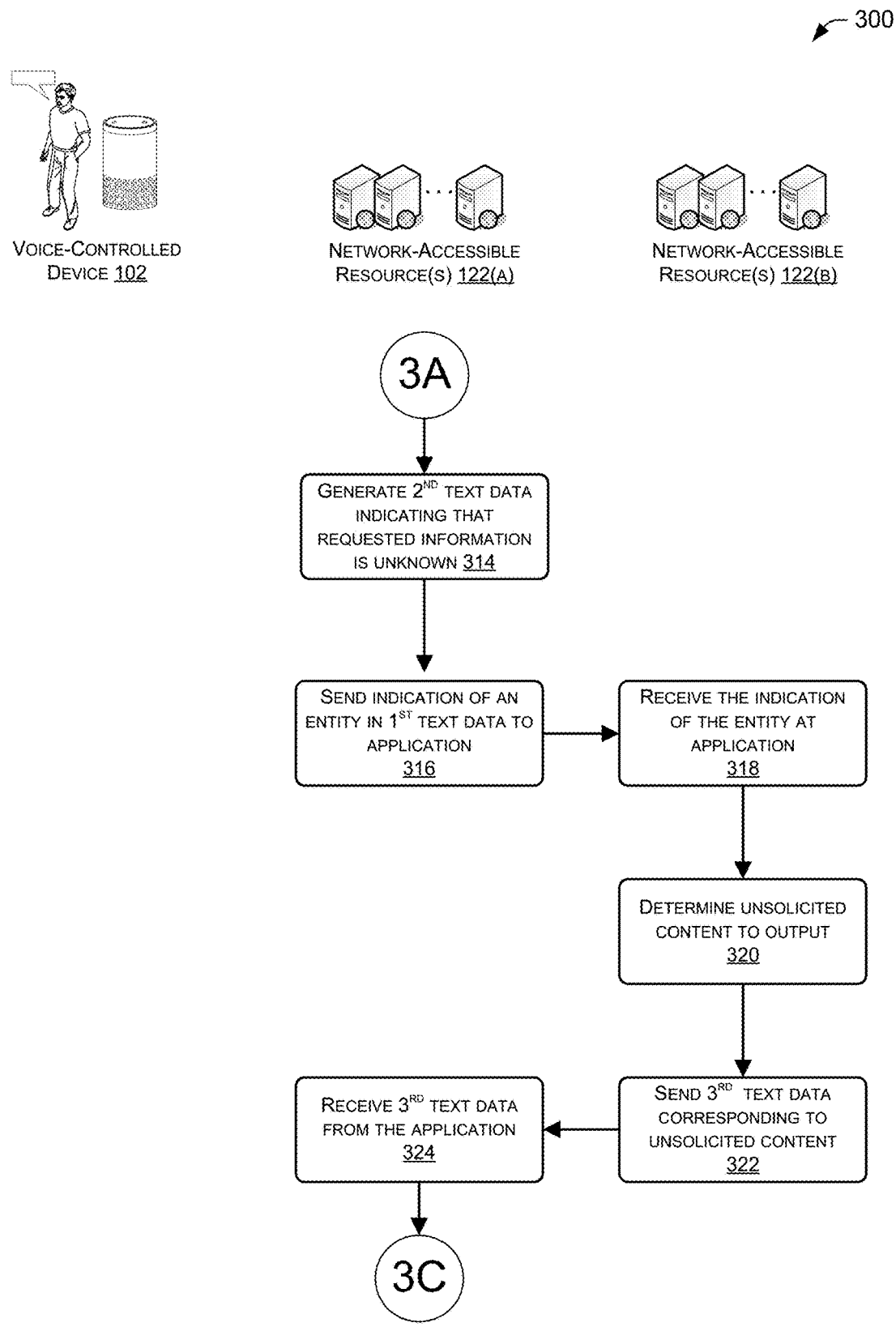
Figure 3C:
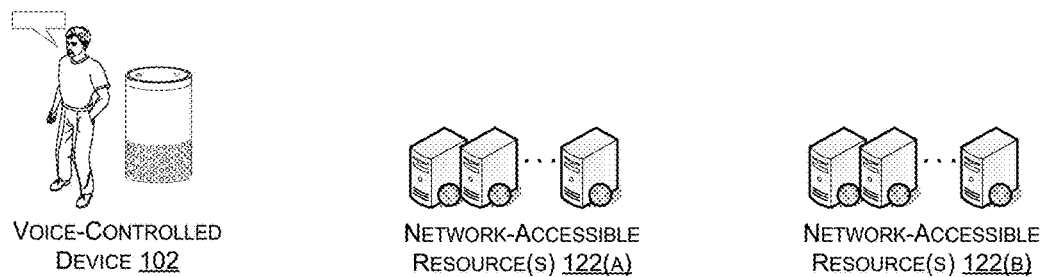
Figure 3C:
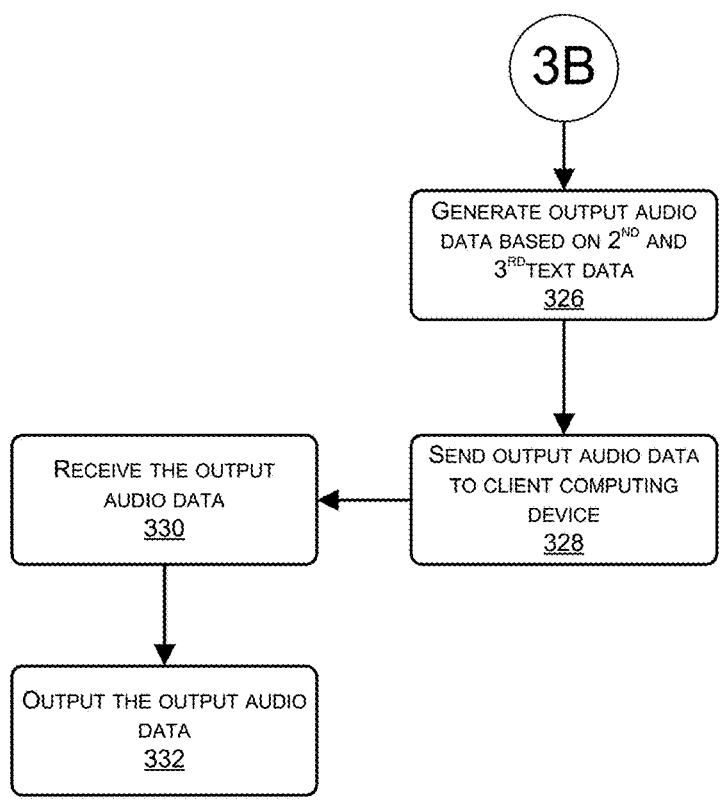

FIGS. 3A-3C collectively illustrate a flow diagram of an example process 300 the network-accessible resources and the voice-controlled device may implement for outputting supplemental content that is unresponsive, but related to, requested information when the requested information is unknown. While this figure illustrates example operations performed by example components, other components may perform some or all of these operations in other implementations. Further, and as noted above, the steps are not intended to be limiting and may be performed in different orders and/or in parallel in some instances.

At 302, the voice-controlled device 102 generates input audio data representing speech. In some instances, this speech comprises a query (e.g., a request for information) from a user. At 304, the voice-controlled device 102 sends the input audio data to a remote system, such as the network-accessible resources 122a. At 306, the resources 122a receive the input audio data from the voice-controlled device and, at 308, performs ASR on the input audio data to generate first text data. At 310, an NLU component of the resources 122a analyze the first text data to identify intent data indicative of the request for information. At 312, the NLU component of the resources 122a may determine that the requested information is unknown. For example, the NLU component may determine that the highest intent score associated with the generated intent data is not greater than a threshold intent score. That is, the NLU component may determine that no application is associated with a high enough intent score to provide a reliable answer to the query.

FIG. 3B continues the illustration of the process 300 and includes, at 314, generating second text data indicating that the request is unknown. For example, the NLU component, an orchestration component, or another component may generate the second text data "I do not know the answer to your question" or the like. Thereafter, the orchestration component or another component may determine to invoke an interesting-facts application for providing additional content in addition to the indication that the answer is unknown. For example, in some instances the orchestration component 136 may determine whether a profile associated with the voice-controlled device 102 has indicated that the device 102 (or the user 104) is to receive the additional, unsolicited content and/or may determine whether an entity referenced in the query is associated with unsolicited content and/or unsolicited content that is of interest to the particular user. To do so, in some instances the voice-controlled device 102 or other client computing device that sent the input audio data to the resources 122a may also send an identifier of the client computing device to the orchestration component 136. The orchestration component 136 may then identify a profile associated with the client computing device to determine whether the device is to receive additional, unsolicited content. In addition, the orchestration component may determine whether to invoke the application (e.g., the interesting-facts application) based on other information, such as an entity (e.g., a person, place, thing, phrase, noise, utterance etc.) referenced in the first text data or the second text data, potentially along with whether the profile has indicated that the user 104 or the device 102 is to receive additional, unsolicited content associated with the referenced entity. In addition, or the alternative, the orchestration component, or other component making this determination, may determine whether to invoke the application based on current network latency. If the latency is greater than a predefined threshold, and thus communicating with the second application may take an undue amount of time, then the orchestration component may refrain from invoking the second application.

At 326, the orchestration component may send an indication of the first text (e.g., the text data corresponding to the utterance) to the application to allow the application to determine whether to provide additional, unsolicited content. At 318, the resources 122b hosting the application receive the indication and, at 320, determines unsolicited content to output. For example, the interesting-facts application may determine certain content to output based on an entity referenced in the first text data, or the like. At 322, the application generates and sends third text data corresponding to unsolicited content. For example, the application may identify an entity referenced in any of the text data or intent data and may determine whether additional, unsolicited content (e.g., an interesting fact about the entity) is stored in association with the entity. In some instances, the second application may perform the ranking of the different pieces of unsolicited content for determining which piece(s) of unsolicited content to return. As noted above with reference to the utterance-selection component 148, the same or different selection criteria may apply, such as personalized factors associated with a profile or a user, other dynamic factors, or the like. In some instances, the second application (or the utterance-selection component 148) may utilize an algorithm based on the selection criteria for determining the most appropriate, timely piece of unsolicited content to output.

After selecting the unsolicited content, at 322, the resources 122b send the third text data corresponding to the selected content to the resources 122a, such as to the orchestration component 136. At 324, the resources 122a receive the third text data from the application.

FIG. 3C concludes the illustration of the process 300 and includes, at 326, generating output audio data based on the second and third text data. For example, the orchestration component may send this text data to the TTS engine for generating one or more audio files for output on the client device. At 328, the resources 122a send the output audio data to the client computing device, which receives the output audio data at 330. At 332, the client computing device outputs the output audio data, thus informing the user that the requested information is unknown while provided information that is related to but nonresponsive to the initial query.

Figure 4:
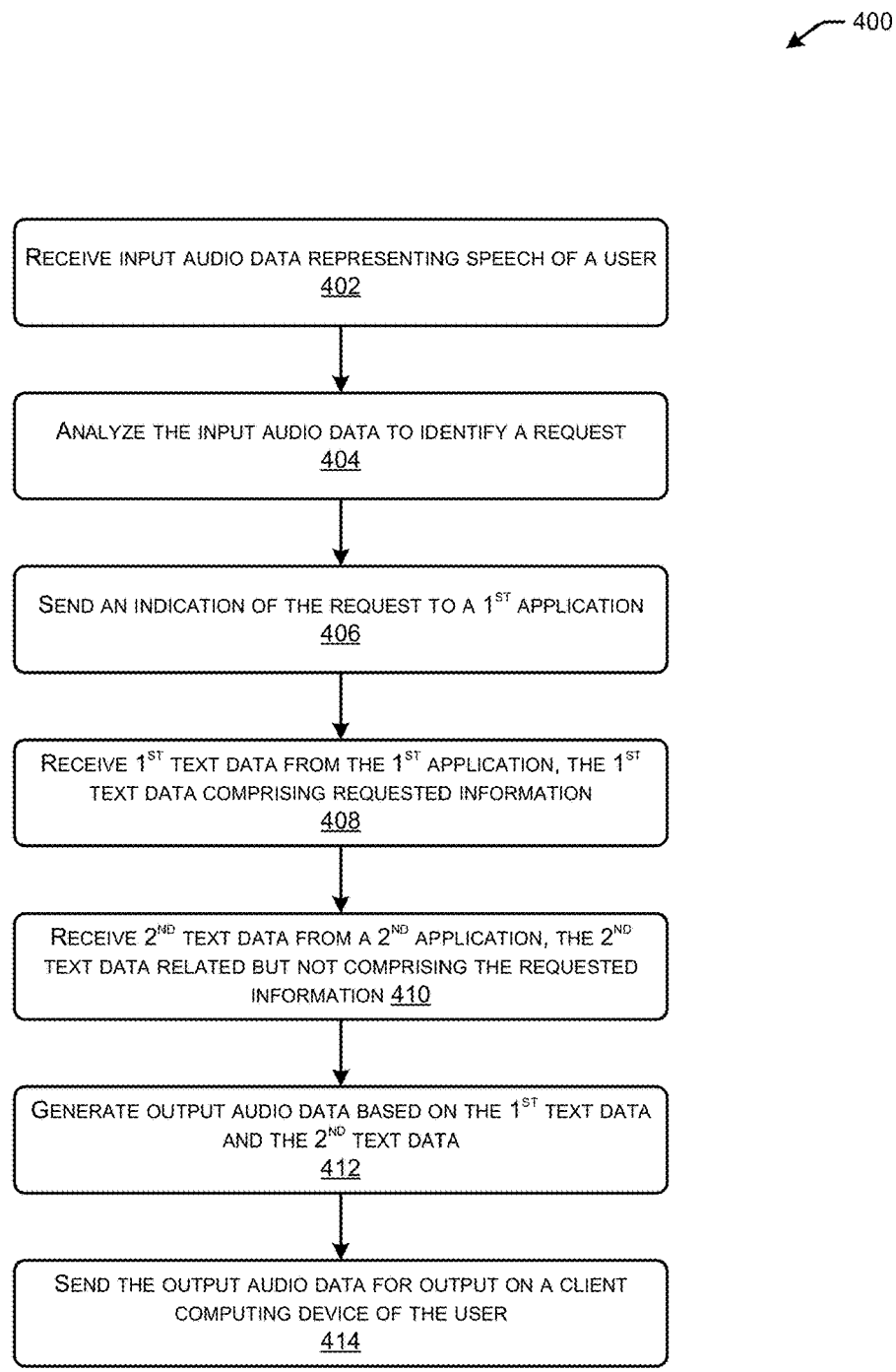
FIG. 4 illustrates a flow diagram of an example process that the network-accessible resources of FIG. 1 may implement for causing the voice-controlled device of FIG. 1 to output the requested information along with unsolicited, related content.

FIG. 4 illustrates a flow diagram of an example process 400 for causing a client computing device to output requested information along with unsolicited, related content. In some instances, the process 400 may be performed in whole or in part by the network-accessible resources 122.

At 402, the resources 122 may receive input audio data representing speech comprising a request for information. For instance, the microphone 106 may capture sound that includes a user utterance, such as the utterance 128a, and may generate corresponding audio data. In some instance, the ASR component 116 on the device 102 may generate text data and may identify, from the text data, a predefined utterance, in this case "wakeup". In response, the device 102 may send generated audio data over the network 120 to the resources 122.

After receiving the input audio data from the voice-controlled device 102, at 404 the resources 122 analyze the input audio data to identify the request. For example, the ASR component 132 may generate text data corresponding to the user utterance, and the NLU component 134 may analyze the text data to generate intent data indicative of the user request. At 406, the resources 122 may send an indication of the identified request to a first application. For example, the NLU component 134 may identify, from the intent data, the application that is best suited to respond to the request for the information. For example, if a user utters "What time does the Seattle football team play?", the NLU component may determine that this text data ("what time does the Seattle football team play?") should be sent to the sports-related application.

At 408, the resources 122 receive first text data from the first application. For instance, the orchestration component 136 may receive first text data from the first application, the first text data corresponding to the requested information. In the example from above, the first text data may correspond to "The game today begins at 1 pm PST."

At 410, the resources 122 also receive second text data from a second application, with the second text data corresponding to content that is related to but different than the requested information. In some instances, the second application comprises the interesting-facts application that is configured to identify, from one or more entities referenced in a user utterance or a response to the user utterance, one or more interesting facts related to the user utterance or the response. In some instances, the orchestration component 136 may send, to the second application, the text data generated by the ASR component 132, the first text data generated by the first application, the intent data generated by the NLU component 134, an indication of any entities referenced in any of the above, and/or the like. Therefore, the second application may determine whether it has one or more interesting facts that are pertinent to the user utterance or the response. In other instances, rather than send this information to the second application, the orchestration component 136 may send some or all of this information to the event bus 130, from which the second application may read the information from determining whether to generate the second text data corresponding to one or more interesting facts.

At 412, the resources 122 may generate one or more output audio data based on the first text data and the second text data. For instance, the orchestration component 136 may send the first and second text data to the TTS engine 140, which generates synthesized speech in the form of output audio data. In some instances, the output audio data comprises a single audio file, while in other instances it comprises multiple files, such as a first audio file corresponding to the first text data and a second audio file corresponding to the second text data. In either instance, the output audio data may be configured such that synthesized speech corresponding to the first text data may be output prior to synthesized speech corresponding to the second text data.

At 414, the resources 122 then send the output audio data to a client computing device for output in the environment of the user. For instance, the orchestration component 136 may send the output audio data to the voice-controlled device, which may output the following in the instant example: "The game today begins at 1 pm PST. Did you know that Acme Coffee opened their first shop in Seattle in 1971?"

Figure 5:
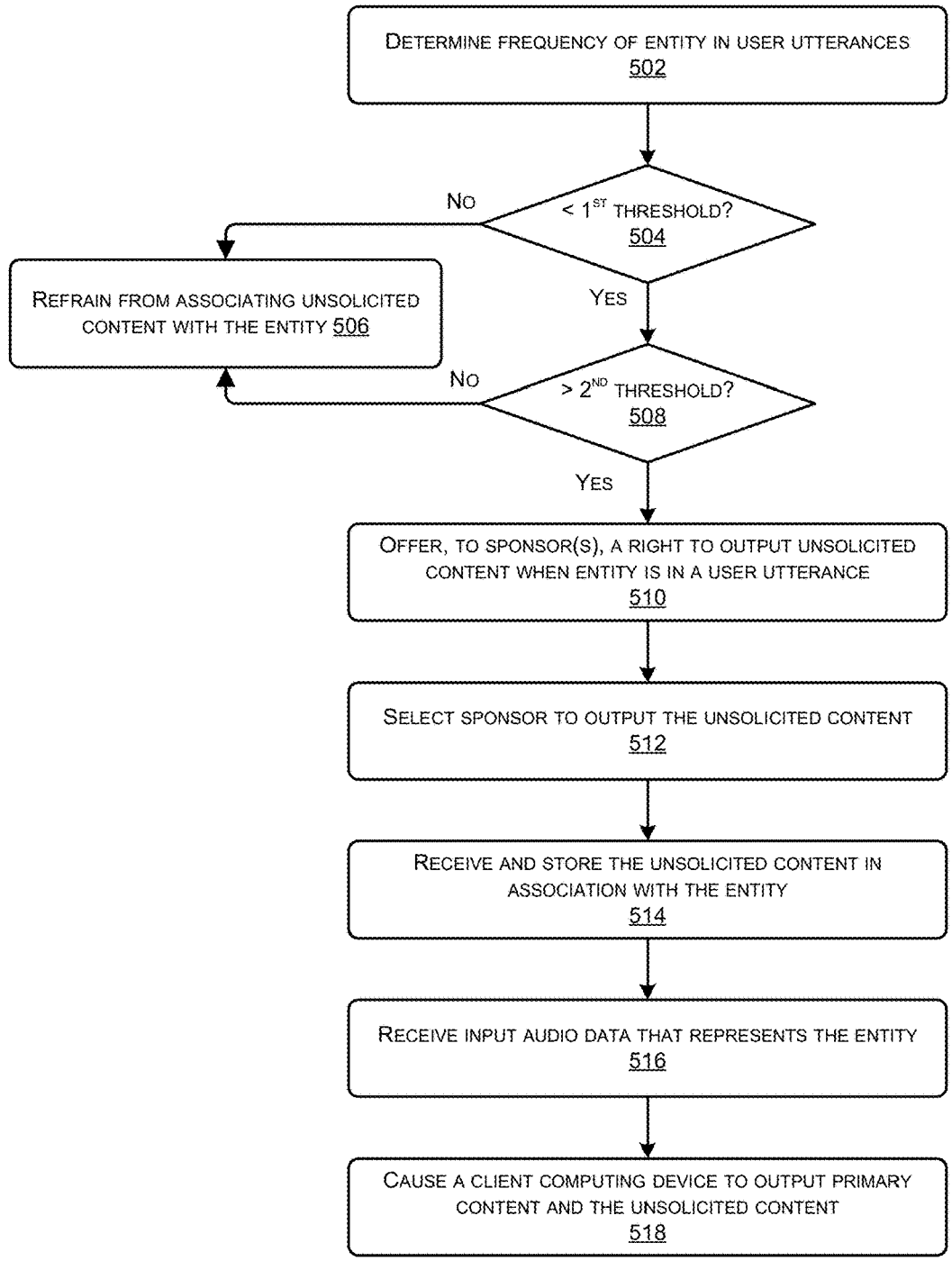
FIG. 5 illustrates a flow diagram of an example process for determining which user utterances to associate with unsolicited content.

FIG. 5 illustrates a flow diagram of an example process 500 for determining which user utterances to associate with unsolicited content (i.e., content that is unresponsive to a query of a user). In some instances, the process 500 may be performed by network-accessible resources 122 having some or all of the components discussed above and below. At 502, the process 500 includes determine a frequency of user utterances, or responses thereto, that include a particular entity. For instance, for a particular entity "Seattle", the process 500 may determine the amount of user utterances and/or responses that include the entity. In some instances, this determination is made across all users, across a subset of user (e.g., based on geography, demographic data, etc.), for a particular user, or the like.

At 504, the process 500 may determine whether amount of user utterances and/or responses that include the entity is less than a first threshold. In some instances, the first threshold may be normalized, such that the entity is judged across the relative frequency of other entities. That is, the first threshold may beset such that the decision block 504 determines that the most common 20% of entities are not less than the first threshold. If the amount is in fact not less than the threshold, at 506 the process 500 refrains from associating unsolicited content with the entity. That is, if the entity is a commonly-used entity, then the process 500 may refrain from associating unsolicited content with the entity.

If, however, the frequency of use of the entity is less than the first threshold, then process may determine, at 508, if the frequency is greater than a second threshold that is less than the first threshold. In some instances, the second threshold may be normalized, such that the entity is again judged across the relative frequency of other entities. That is, the first threshold may be set such that the decision block 508 determines that the most rare 20% of entities are not greater than the second threshold. If the amount is in fact not greater than the threshold, at 508 the process 500 refrains from associating unsolicited content with the entity at 506. That is, if the entity is a rarely-used entity, then the process 500 may refrain from associating unsolicited content with the entity.

If, however, an entity occurs in user utterances and/or responses less than the first threshold amount but greater than a second threshold amount, then at 510 the process 500 may offer, to one or more content sources, a right to output unsolicited content when the entity is used in a user utterance or a response to a user utterance. For example, for the entity "coffee", the process 500 may offer, to one or more content sources, the opportunity to output interesting facts about coffee and/or a company of the content source (or other information) when the entity "coffee" is used in a user utterance or a response to a user utterance. At 512, the process selects one or more content sources to output the unsolicited content in association with each of potential multiple entities. In some instances, the selection of the content source may be based on a value that each content source offers for the right to output the additional content, the amount that each content source will reward users that receive the additional content, and/or the like. In some instances, for a given entity, a content source that offers a highest value may acquire the right to output the additional, unsolicited content with the entity.

At 514, the process 500 receives and stores unsolicited content in association with the entity. In some instances, the selected content source, for a given entity, may acquire and provide the unsolicited content, such as one or more interesting facts. In other instances, the system that offers the right to output the additional content curates and sources the additional content (e.g., interesting fact(s)) on behalf of the content source. In either instance, at 516 the process 500 may receive input audio data that represents the entity and, at 518, the process 500 may cause a client computing device to output both primary content (e.g., the content requested) and the unsolicited content (e.g., the interesting fact(s)).

Figure 6:
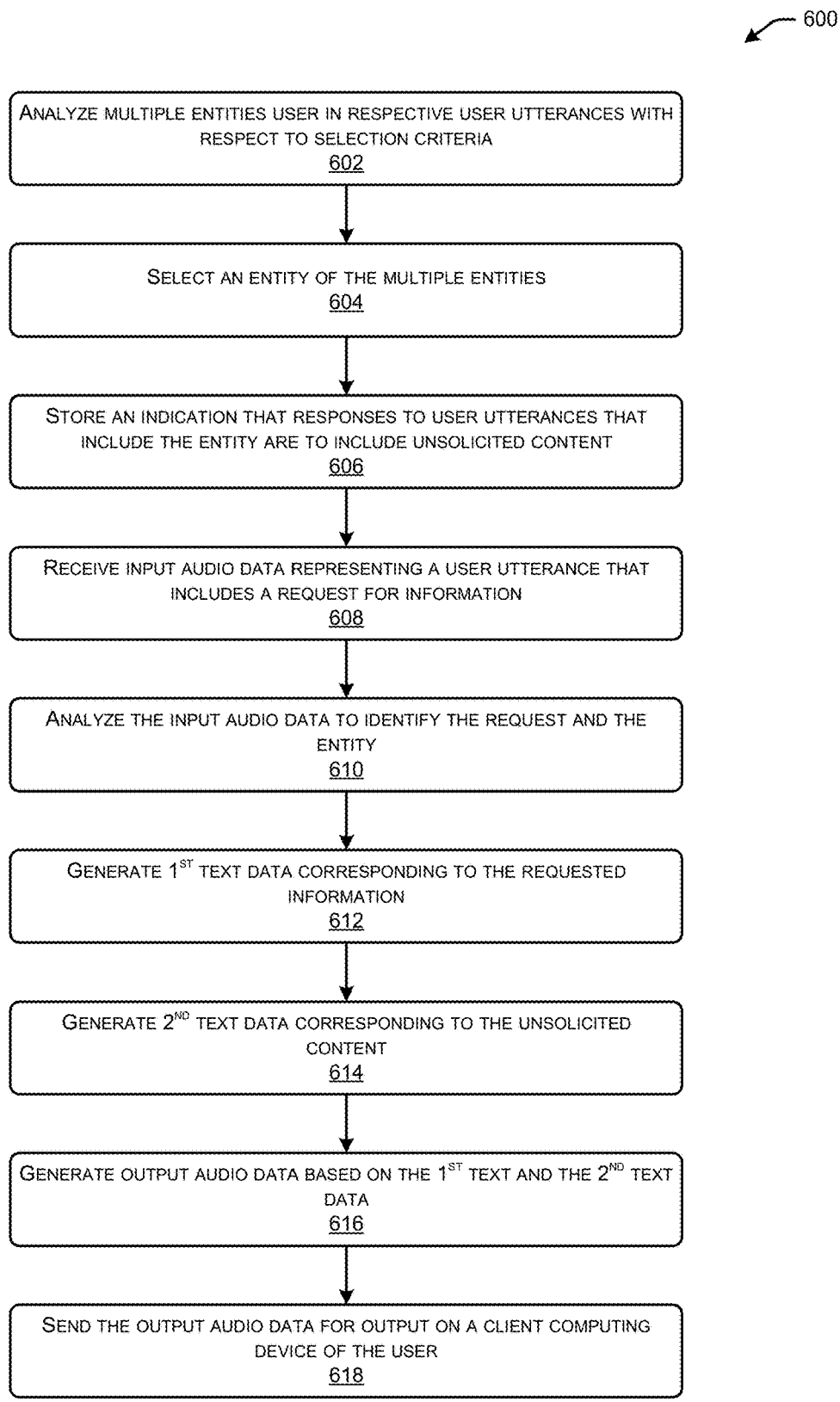
FIG. 6 illustrates a flow diagram of another example process for determining which user utterances to associate with unsolicited content.

FIG. 6 illustrates a flow diagram of another example process 600 for determining user utterances to associate with unsolicited content. In some instances, the process 600 may be performed in whole or in part by the network-accessible resources 122, such as by the utterance selection component 148. At 602, the process 600 analyzes multiple entities used in respective user utterances with respect to one or more selection criteria. For example, the utterance-selection component 148 may analyze prior user utterances to determine which entities (e.g., person, places, things, places, phrases, etc.) used in prior user utterances are to be associated with addition, unsolicited content. The selection criteria utilized by the utterance-selection component 148 may include the frequency of occurrence of the entities in the user utterances, whether the respective entity is trending (e.g., appearing in more or and more user utterances), whether the entity corresponds to one or more current events (e.g., entities used in recent news article, etc.), a value that a content source that provided the content will provide for output of the content, or the like. In some instances, the selection criteria may be user-specific. That is, the utterance-selection component 148 may reference an identifier of a computing device to identify a profile associated with the computing device. The component 148 may then analyze the profile to generate the selection criteria that are tailored to the profile. For instance, the component 148 may analyze the profile to determine topics of interest to a user, purchase habits, a search history, a geographic location associated with the profile, demographic information associated with profile, or any other type of data.

At 604, the process 600 selects one or more entities of the multiple entities for associating with unsolicited content. In some instances, the selection may be specific to a user. For instance, a first user who is interested in the town of Seattle may receive unsolicited content regarding Seattle in response to user queries that are related to Seattle. Another user who is interested in soccer, may receive unsolicited content regarding soccer in response to user queries regarding soccer. At 606, the process 600 stores an indication that responses to user utterances that include the selected entity are to be output with unsolicited content. Again, the selection of this entity may be based on a content source acquiring a right to output unsolicited content in association with the entity, based on preferences of a user, interests of the user, past behavior of the user, purchase history of the user, and/or the like.

At 608, the process 600 includes receive input audio data representing a user utterance that includes a request for information. At 610, the input audio data is analyzed to identify the request and to identify the particular entity. At 612, the process 600 generates first text data corresponding to the requested information, such as the first text data corresponding to the answer to a user's query. At 614, the process 600 also generates second text data corresponding to additional, unsolicited content, such as an interesting fact associated with the input audio data or the first text data. At 616, the process 6(x) generates output audio data based on the first text data and the second text data and, at 618, sends the output audio data for output on a client computing device of the user.

Figure 7:
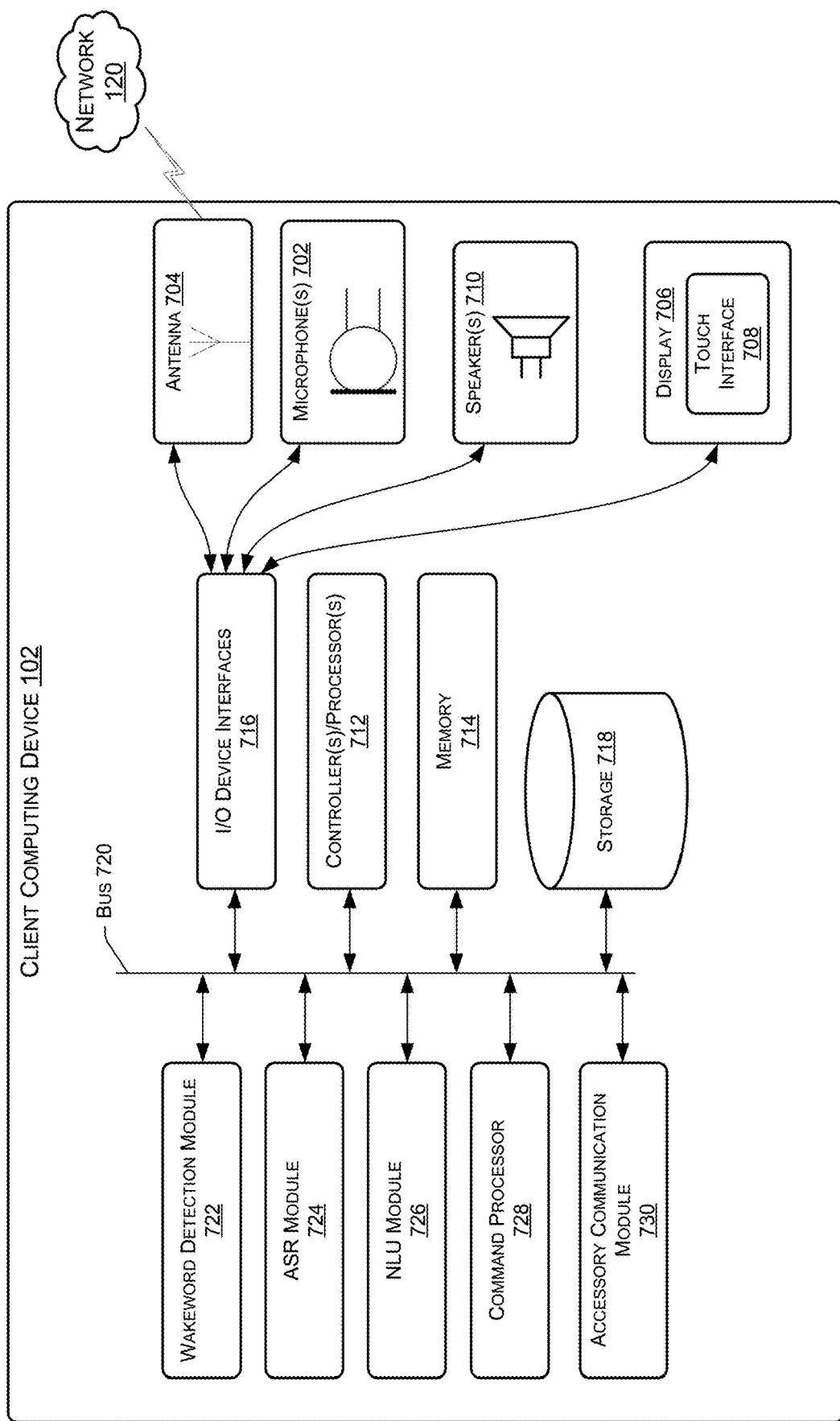
FIG. 7 illustrates a conceptual diagram of example components of a voice-controlled device, such as the voice-controlled device of FIG. 1.

FIG. 7 illustrates a conceptual diagram of example components of a voice-controlled device, such as the voice-controlled device 102. The voice-controlled device 102 may be implemented as a standalone device 102 that is relatively simple in terms of functional capabilities with limited input/output components, memory, and processing capabilities. For instance, the voice-controlled device 102 may not have a keyboard, keypad, or other form of mechanical input. The device 102 may also lack a display (other than simple lights, for instance) and a touch screen to facilitate visual presentation and user touch input. Instead, the device 102 may be implemented with the ability to receive and output audio, a network interface (wireless or wire-based), power, and processing/memory capabilities. In certain implementations, a limited set of one or more input components may be employed (e.g., a dedicated button to initiate a configuration, power on/off, etc.) by the voice-controlled device 102. Nonetheless, the primary, and potentially only mode, of user interaction with the device 102 is through voice input and audible output. In some instances, the device 102 may simply comprise a microphone 702, a power source, and functionality for sending generated audio data via one or more antennas 704 to another device.

The voice-controlled device 102 may also be implemented as a more sophisticated computing device, such as a computing device similar to, or the same as, a smart phone or personal digital assistant. The device 102 may include a display 706 with a touch interface 708 and various buttons for providing input as well as additional functionality such as the ability to send and receive communications. Alternative implementations of the voice-controlled device 102 may also include configurations as a personal computer. The personal computer may include a keyboard, a mouse, a display 706, and other hardware or functionality that is found on a desktop, notebook, netbook, or other personal computing devices. In other examples, the voice-controlled device 102 may take the form of a portion of an automobile, a pin on a user's clothes, a mobile phone, or any other form factor. In examples, the voice-controlled device 102 may include speaker(s) 710. In other examples, the voice-controlled device 102 may not include speaker(s) 710 and may utilize speaker(s) of an external or peripheral device to output audio via the speaker(s) of the external/peripheral device. In this example, the voice-controlled device 102 might represent a set-top box (STB), and the device 102 may utilize speaker(s) of an accessory device, such as a television, that is connected to the STB for output of audio via the external speakers. In other examples, the voice-controlled device 102 may not include the microphone(s) 702, and instead, the voice-controlled device 102 can utilize microphone(s) of an external or peripheral device to capture audio and/or generate audio data. In this example, the voice-controlled device 102 may utilize microphone(s) of a headset that is coupled (wired or wirelessly) to the voice-controlled device 102. These types of devices are provided by way of example and are not intended to be limiting, as the techniques described in this disclosure may be used in essentially any device that has an ability to recognize speech input or other types of natural language input.

The device 102 may include one or more controllers/processors 712, which may include a central processing unit (CPU) for processing data and computer-readable instructions, and memory (or "computer-readable media") 714 for storing data and instructions of the device 102. The device 102 may also be connected to removable or external non-volatile memory and/or storage, such as a removable memory card, memory key drive, networked storage, etc., through one or more input/output device interfaces 716.

Computer instructions for operating the device 102 and its various components may be executed by the device's controller(s)/processor(s) 712, using the memory 714 as temporary "working" storage at runtime. A device's computer instructions may be stored in a non-transitory manner in non-volatile memory 714, storage 718, or an external device(s). Alternatively, some or all of the executable instructions may be embedded in hardware or firmware on the device 102 in addition to or instead of software.

The device 102 may include input/output device interfaces 716. A variety of components may be connected through the input/output device interfaces 716. Additionally, the device 102 may include an address/data bus 720 for conveying data among components of the device. Each component within the device 102 may also be directly connected to other components in addition to, or instead of, being connected to other components across the bus 720.

The device 102 may further include, in some instances, the display 706, which may comprise the touch interface 708. Any suitable display technology, such as liquid crystal display (LCD), organic light emitting diode (OLED), electrophoretic, and so on, may be utilized for the display 706. Furthermore, the processor(s) 712 may comprise graphics processors for driving animation and video output on the associated display 706, or the device 102 may be "headless" and may primarily rely on spoken commands for input. As a way of indicating to a user that a connection between another device has been opened, the device 102 may be configured with one or more visual indicators, such as the light source(s), which may be in the form of LED(s) or similar components, that may change color, flash, or otherwise provide visible light output on the device 102. The input/output device interfaces 716 may connect to a variety of components, such as a speaker 710 for outputting audio (e.g., audio corresponding to audio content, a text-to-speech (TTS) response, etc.), a wired or wireless headset, or other component capable of outputting audio. A wired or a wireless audio and/or video port may allow for input/output of audio/video to/from the device 102. The device 102 may also include an audio capture component. The audio capture component may be, for example, a microphone 702 or array of microphones, a wired or wireless headset, etc. The microphone 702 may be configured to capture audio. If an array of microphones is included, approximate distance to a sound's point of origin may be determined using acoustic localization based on time and amplitude differences between sounds captured by different microphones of the array. The device 102 (using microphone 402, wakeword detection module 722, ASR module 724, etc.) may be configured to generate audio data corresponding to captured audio. The device 102 (using input/output device interfaces 716, antenna 704, etc.) may also be configured to transmit the audio data to the remote system associated with the resources 122 for further processing or to process the data using internal components such as a wakeword detection module 722.

Via the antenna(s) 704, the input/output device interfaces 716 may connect to one or more networks 120 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc. A wired connection such as Ethernet may also be supported. Universal Serial Bus (USB) connections may also be supported. Power may be provided to the device 102 via wired connection to an external alternating current (AC) outlet, and/or via onboard power sources, such as batteries, solar panels, etc.

Through the network(s) 120, the speech processing system may be distributed across a networked environment. Accordingly, the device 102 and/or the remote system that comprises the resources 122 may include an ASR module 724. The ASR module 724 of device 102 may be of limited or extended capabilities. The ASR module 724 may include language models stored in ASR model storage component, and an ASR module 724 that performs automatic speech recognition. If limited speech recognition is included, the ASR module 724 may be configured to identify a limited number of words, such as keywords detected by the device, whereas extended speech recognition may be configured to recognize a much larger range of words.

The device 102 and/or the remote system associated with the resources 122 may include a limited or extended NLU module 726. The NLU module 726 of device 102 may be of limited or extended capabilities. The NLU module 726 may comprise a name entity recognition module, an intent classification module and/or other components. The NLU module 726 may also include a stored knowledge base and/or entity library, or those storages may be separately located.

The device 102 and/or the remote system comprising resources 122 may also include a command processor 728 that is configured to execute commands/functions associated with a spoken command as described herein. The device 102 may include a wakeword detection module 722, which may be a separate component or may be included in an ASR module 724. The wakeword detection module 722 receives audio signals and detects occurrences of a particular expression (such as a configured keyword) in the audio. This may include detecting a change in frequencies over a specific period of time where the change in frequencies results in a specific audio signature that the system recognizes as corresponding to the keyword. Keyword detection may include analyzing individual directional audio signals, such as those processed post-beamforming if applicable. Other techniques known in the art of keyword detection (also known as keyword spotting) may also be used. In some embodiments, the device 102 may be configured collectively to identify a set of the directional audio signals in which the wake expression is detected or in which the wake expression is likely to have occurred.

FIG. 8 illustrates a conceptual diagram of how a spoken utterance can be processed, allowing a system to capture and execute commands spoken by a user, such as spoken commands that may follow a wakeword, or trigger expression, (i.e., a predefined word or phrase for "waking" a device, causing the device to begin sending audio data to a remote system, such as a system comprising the network-accessible resources 122). The various components illustrated may be located on a same or different physical devices. Communication between various components illustrated in FIG. 8 may occur directly or across a network 120. An audio capture component, such as a microphone 106 of the device 102, or another device, captures audio 800 corresponding to a spoken utterance. The device 102, using a wakeword detection module 801, then processes audio data corresponding to the audio 800 to determine if a keyword (such as a wakeword) is detected in the audio data. Following detection of a wakeword, the device 102 sends audio data 802 corresponding to the utterance to the remote system that includes the ASR component 132. The audio data 802 may be output from an optional acoustic front end (AFE) 856 located on the device prior to transmission.

The wakeword detection module 801 works in conjunction with other components of the user device, for example a microphone to detect keywords in audio 800. For example, the device may convert audio 800 into audio data, and process the audio data with the wakeword detection module 801 to determine whether human sound is detected, and if so, if the audio data comprising human sound matches an audio signature and/or model corresponding to a particular keyword.

The user device may use various techniques to determine whether audio data includes human sound. Some embodiments may apply voice activity detection (VAD) techniques. Such techniques may determine whether human sound is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the user device may implement a limited classifier configured to distinguish human sound from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in human sound storage, which acoustic models may include models corresponding to human sound, noise (such as environmental noise or background noise), or silence. Still other techniques may be used to determine whether human sound is present in the audio input.

Once human sound is detected in the audio received by user device (or separately from human sound detection), the user device may use the wakeword detection module 801 to perform wakeword detection to determine when a user intends to speak a command to the user device. This process may also be referred to as keyword detection, with the wakeword being a specific example of a keyword. Specifically, keyword detection may be performed without performing linguistic analysis, textual analysis or semantic analysis. Instead, incoming audio (or audio data) is analyzed to determine if specific characteristics of the audio match preconfigured acoustic waveforms, audio signatures, or other data to determine if the incoming audio "matches" stored audio data corresponding to a keyword.

Thus, the wakeword detection module 801 may compare audio data to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds hidden Markov models (HMM) for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating hybrid DNN-HMM decoding framework. In another embodiment, the wakeword spotting system may be built on deep neural network (DNN)/recursive neural network (RNN) structures directly, without HMM involved. Such a system may estimate the posteriors of wakewords with context information, either by stacking frames within a context window for DNN, or using RNN. Following-on posterior threshold tuning or smoothing is applied for decision making. Other techniques for wakeword detection, such as those known in the art, may also be used.

Once the wakeword is detected, the local device 102 may "wake" and begin transmitting audio data 802 corresponding to input audio 800 to the remote system for speech processing. Audio data corresponding to that audio may be sent to remote system for sending to a recipient device or may be sent to the remote system for speech processing for interpretation of the included speech (either for purposes of enabling voice-communications and/or for purposes of executing a command in the speech). The audio data 802 may include data corresponding to the wakeword, or the portion of the audio data corresponding to the wakeword may be removed by the local device 102 prior to sending. Further, a local device may "wake" upon detection of speech/spoken audio above a threshold, as described herein. Upon receipt by the remote system, an ASR component 132 may convert the audio data 802 into text data. The ASR transcribes audio data into text data representing the words of the speech contained in the audio data 802. The text data may then be used by other components for various purposes, such as executing system commands, inputting data, etc. A spoken utterance in the audio data is input to a processor configured to perform ASR which then interprets the utterance based on the similarity between the utterance and pre-established language models 854 stored in an ASR model knowledge base (ASR Models Storage 852). For example, the ASR process may compare the input audio data with models for sounds (e.g., subword units or phonemes) and sequences of sounds to identify words that match the sequence of sounds spoken in the utterance of the audio data.

The different ways a spoken utterance may be interpreted (i.e., the different hypotheses) may each be assigned a probability or a confidence score representing the likelihood that a particular set of words matches those spoken in the utterance. The confidence score may be based on a number of factors including, for example, the similarity of the sound in the utterance to models for language sounds (e.g., an acoustic model 853 stored in an ASR Models Storage 852), and the likelihood that a particular word that matches the sounds would be included in the sentence at the specific location (e.g., using a language or grammar model). Thus, each potential textual interpretation of the spoken utterance (hypothesis) is associated with a confidence score. Based on the considered factors and the assigned confidence score, the ASR component 132 outputs the most likely text data recognized in the audio data. The ASR process may also output multiple hypotheses in the form of a lattice or an N-best list with each hypothesis corresponding to a confidence score or other score (such as probability scores, etc.).

The device or devices performing the ASR processing may include an acoustic front end (AFE) 856 and a speech recognition engine 858. The acoustic front end (AFE) 856 transforms the audio data from the microphone into data for processing by the speech recognition engine 858. The speech recognition engine 858 compares the speech recognition data with acoustic models 853, language models 854, and other data models and information for recognizing the speech conveyed in the audio data. The AFE 856 may reduce noise in the audio data and divide the digitized audio data into frames representing time intervals for which the AFE 856 determines a number of values, called features, representing the qualities of the audio data, along with a set of those values, called a feature vector, representing the features/qualities of the audio data within the frame. Many different features may be determined, as known in the art, and each feature represents some quality of the audio that may be useful for ASR processing. A number of approaches may be used by the AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 858 may process the output from the AFE 856 with reference to information stored in speech/model storage (852). Alternatively, post front-end processed data (such as feature vectors) may be received by the device executing ASR processing from another source besides the internal AFE. For example, the user device may process audio data into feature vectors (for example using an on-device AFE 856) and transmit that information to a server across a network for ASR processing. Feature vectors may arrive at the remote system encoded, in which case they may be decoded prior to processing by the processor executing the speech recognition engine 858.

The speech recognition engine 858 attempts to match received feature vectors to language phonemes and words as known in the stored acoustic models 853 and language models 854. The speech recognition engine 858 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically. The specific models used may be general models or may be models corresponding to a particular application (also referred to herein as "domains" or "speechlets"), such as music, banking, etc. By way of example, a user utterance may be "Alexa, what time does the Seattle football team play?" The wake detection module may identify the wake word, otherwise described as a trigger expression, in this case "Alexa," in the user utterance and may "wake" based on identifying the wake word. Audio data corresponding to the user utterance may be sent to the resources 122 of the remote system, where the speech recognition engine 858 may identify, determine, and/or generate text data corresponding to the user utterance, here "what time does the Seattle football team play?"

The speech recognition engine 858 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text data matches for the same sound.

Following ASR processing, the ASR results may be sent by the speech recognition engine 858 to other processing components, which may be local to the device performing ASR and/or distributed across the network(s). For example, ASR results in the form of a single textual representation of the speech, an N-best list including multiple hypotheses and respective scores, lattice, etc. may be sent to the remote system, for natural language understanding (NLU) processing, such as conversion of the text data into commands for execution, either by the user device, by the remote system, or by another device (such as a server running a specific application like a search engine, etc.).

The device performing NLU processing may include various components, including potentially dedicated processor(s), memory, storage, etc. As shown in FIG. 8, an NLU component 134 may include a recognizer 863 that includes a named entity recognition (NER) module 862 which is used to identify portions of query text data that correspond to a named entity that may be recognizable by the system. A downstream process called named entity resolution links a portion of the text data to a specific entity known to the system. To perform named entity resolution, the system may utilize gazetteer information (884a-884n) stored in entity library storage 882. The gazetteer information may be used for entity resolution, for example matching ASR results with different entities (such as song titles, contact names, etc.) Gazetteers may be linked to users (for example a particular gazetteer may be associated with a specific user's music collection), may be linked to certain applications (or "domains"), such as a sports-related application, an interesting-facts application, or the like.

Generally, the NLU process takes textual input (such as processed from the ASR component 132 based on the utterance input audio 800) and attempts to make a semantic interpretation of the text data. That is, the NLU process determines the meaning behind the text data based on the individual words and then implements that meaning. NLU component 134 interprets a text string to derive an intent or a desired action from the user as well as the pertinent pieces of information in the text data that allow a device (e.g., device 102) to complete that action. For example, if a spoken utterance is processed using ASR component 132 and outputs the text data "add music to the kitchen" the NLU process may determine that the user intended for the audio being output by a device also be output by another device associated with the identifier of kitchen.

The NLU may process several textual inputs related to the same utterance. For example, if the ASR component 132 outputs N text segments (as part of an N-best list), the NLU may process all N outputs to obtain NLU results. As will be discussed further below, the NLU process may be configured to parse and tag to annotate text data as part of NLU processing. For example, for the text data "what time does the Seattle football team play?," "what time" may be tagged as a command and "Seattle" may be tagged as the entity for which the information is requested (e.g., for which the command is to be processed against).

To correctly perform NLU processing of speech input, the NLU component 134 may be configured to determine an application (or domain or speechlet) to which to send the utterance so as to determine and narrow down which services offered by the endpoint device (e.g., remote system or the user device) may be relevant. For example, an endpoint device may offer services relating to interactions with a telephone system, a contact list system, a calendar/scheduling system, a music player system, etc. Words in a single text query may implicate more than one system, and some systems may be functionally linked (e.g., both a telephone system and a calendar system may utilize data from the contact list). For example, and as described above, the NLU component 134 may send data associated with the utterance "What time does the Seattle football team play?" to the sports application, and may send information associated with this utterance or its response to the interesting-facts application.

The named entity recognition (NER) module 862 receives a query in the form of ASR results and attempts to identify relevant grammars and lexical information that may be used to construe meaning. To do so, the NLU component 134 may begin by identifying potential applications (or domains/speechlets) that may relate to the received query. The NLU storage 873 includes a database of devices (874a-874n) identifying domains associated with specific devices. For example, the user device may be associated with domains for music, telephony, calendaring, contact lists, and device-specific communications, but not video. In addition, the entity library may include database entries about specific services on a specific device, either indexed by Device ID, User ID, or Household ID, or some other indicator.

In NLU processing, a domain may represent a discrete set of activities having a common theme, such as "sports," "shopping," "music," "calendaring," etc. As such, each domain may be associated with a particular recognizer 863, language model and/or grammar database (876a-876n), a particular set of intents/actions (878a-878n), and a particular personalized lexicon (886). Each gazetteer (884a-884n) may include domain-indexed lexical information associated with a particular user and/or device. For example, the Gazetteer A (884a) includes domain-index lexical information 886aa to 886an. A user's contact-list lexical information might include the names of contacts. Since every user's contact list is presumably different, this personalized information improves entity resolution.

As noted above, in traditional NLU processing, a query may be processed applying the rules, models, and information applicable to each identified domain. For example, if a query potentially implicates both communications and, for example, music, the query may, substantially in parallel, be NLU processed using the grammar models and lexical information for communications, and will be processed using the grammar models and lexical information for music. The responses based on the query produced by each set of models is scored, with the overall highest ranked result from all applied domains ordinarily selected to be the correct result.

An intent classification (IC) module 864 parses the query to determine an intent or intents for each identified domain, where the intent corresponds to the action to be performed that is responsive to the query. Each domain is associated with a database (878a-878n) of words linked to intents. For example, a music intent database may link words and phrases such as "quiet," "volume off," and "mute" to a "mute" intent. By way of further example, a timer intent database may link words and phrases such as "set," "start," "initiate," and "enable" to a "set timer" intent. A voice-message intent database, meanwhile, may link words and phrases such as "send a message," "send a voice message," "send the following," or the like. The IC module 864 identifies potential intents for each identified domain by comparing words in the query to the words and phrases in the intents database 878. In some instances, the determination of an intent by the IC module 864 is performed using a set of rules or templates that are processed against the incoming text data to identify a matching intent.

In order to generate a particular interpreted response, the NER 862 applies the grammar models and lexical information associated with the respective domain to actually recognize a mention of one or more entities in the text data of the query. In this manner, the NER 562 identifies "slots" or values (i.e., particular words in query text data) that may be needed for later command processing. Depending on the complexity of the NER 862, it may also label each slot with a type of varying levels of specificity (such as noun, place, city, artist name, song name, amount of time, timer number, or the like). Each grammar model 876 includes the names of entities (i.e., nouns) commonly found in speech about the particular application or domain (i.e., generic terms), whereas the lexical information 886 from the gazetteer 884 is personalized to the user(s) and/or the device. For instance, a grammar model associated with the shopping domain may include a database of words commonly used when people discuss shopping.

The intents identified by the IC module 864 are linked to domain-specific grammar frameworks (included in 876) with "slots" or "fields" to be filled with values. Each slot/field corresponds to a portion of the query text data that the system believes corresponds to an entity. To make resolution more flexible, these frameworks would ordinarily not be structured as sentences, but rather based on associating slots with grammatical tags.

For example, the NER module 862 may parse the query to identify words as subject, object, verb, preposition, etc., based on grammar rules and/or models, prior to recognizing named entities. The identified verb may be used by the IC module 564 to identify intent, which is then used by the NER module 862 to identify frameworks. A framework for the intent of "play a song," meanwhile, may specify a list of slots/fields applicable to play the identified "song" and any object modifier (e.g., specifying a music collection from which the song should be accessed) or the like. The NER module 862 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

The frameworks linked to the intent are then used to determine what database fields should be searched to determine the meaning of these phrases, such as searching a user's gazette for similarity with the framework slots. If the search of the gazetteer does not resolve the slot/field using gazetteer information, the NER module 862 may search the database of generic words associated with the domain (in the knowledge base 872). So, for instance, if the query was "set a timer for 600 seconds," after failing to determine the amount of time to set the timer for, the NER component 862 may search the domain vocabulary for the phrase "600 seconds." In the alternative, generic words may be checked before the gazetteer information, or both may be tried, potentially producing two different results.

The output data from the NLU processing (which may include tagged text data, commands, etc.) may then be sent to a command processor 807. The destination command processor 807 may be determined based on the NLU output. For example, if the NLU output includes a command to send a message, the destination command processor 807 may be a message sending application, such as one located on the user device or in a message sending appliance, configured to execute a message sending command. If the NLU output includes a search request, the destination command processor 807 may include a search engine processor, such as one located on a search server, configured to execute a search command. After the appropriate command is generated based on the intent of the user, the command processor 807 may provide some or all of this information to a text-to-speech (TTS) engine, such as the TTS engine 140. The TTS engine may then generate an actual audio file for outputting the audio data determined by the command processor 507 (e.g., "The game today begins at 1 pm . . . "). After generating the file (or "audio data"), the TTS engine may provide this data back to the remote system for sending the device 102. In addition, the command process 807 may further include one or more skills or other type of speechlets, including Alexa Skill, Cortana Skill, Siri App, Google Assistant Action, Facebook M Bot, Google Allo Bot, Slack Bot, etc., which allow the speech processing system to interface with other types of systems (e.g., through an application program interface ("API") or by any other means).

In some instances, the network-accessible resources 122a and resources 122b from FIG. 1 may communicate with one another via the command processor 807. For example, the command processor 807 may communicate with the network-accessible resources 122b in response to speech-processing components of the resources 122a recognizing a user utterance from a received audio signal. Furthermore, in some instances the network-accessible resources 122b may provide data to the NLU storage 873 and/or the entity library 862 via the command processor 807 prior to runtime. For example, an application stored on the resources 122b may provide domain-related data to the NLU storage 873 and/or the entity library.

FIG. 8 further illustrates that the system may include the orchestration component 136 and the TTS engine 140, discussed above with reference to FIG. 1 and other figures. The orchestration component 136 may orchestrate interactions between different components of the system, such as interactions between the ASR component 132, the NLU component 132, the command processor 807, the TTS engine 140 and/or the like. The TTS engine 140 may, as described above, receive text data and generate output audio data for output at the client device 102.

The NLU operations of existing systems may take the form of a multi-application (or multi-domain_architecture. Each application or domain (which may include a set of intents and entity slots that define a larger concept such as music, books etc. as well as components such as trained models, etc. used to perform various NLU operations such as NER, IC, or the like) may be constructed separately and made available to an NLU component 134 during runtime operations where NLU operations are performed on text data (such as text data output from an ASR component 132). Each domain may have specially configured components to perform various steps of the NLU operations.

For example, in a NLU system, the system may include a multi-domain architecture consisting of multiple domains for intents/commands executable by the system (or by other devices connected to the system), such as music, video, books, and information. The system may include a plurality of domain recognizers 863, where each domain may include its own recognizer 863. Each recognizer may include various NLU components such as an NER component 862, IC module 864 and other components such as an entity resolver, or other components.

For example, a messaging domain recognizer 863-A (Domain A) may have an NER component 862-A that identifies what slots (i.e., portions of input text data) may correspond to particular words relevant to that domain (or "application"). The words may correspond to entities such as (for the messaging domain) a recipient. An NER component 862 may use a machine learning model, such as a domain specific conditional random field (CRF) to both identify the portions corresponding to an entity as well as identify what type of entity corresponds to the portion of the text data. The messaging domain recognizer 863-A may also have its own intent classification (IC) component 864-A that determines the intent of the text data assuming that the text data is within the proscribed domain. An IC component may use a model, such as a domain specific maximum entropy classifier to identify the intent of the text data, where the intent is the action the user desires the system to perform. For this purpose, the remote system computing device may include a model training component. The model training component may be used to train the classifier(s)/machine learning models discussed above.

As noted above, multiple devices may be employed in a single speech processing system. In such a multi-device system, each of the devices may include different components for performing different aspects of the speech processing. The multiple devices may include overlapping components. The components of the user device and the remote system, as illustrated herein are exemplary, and may be located in a stand-alone device or may be included, in whole or in part, as a component of a larger device or system, may be distributed across a network or multiple devices connected by a network, etc.

While the foregoing disclosure is described with respect to the specific examples, it is to be understood that the scope of the disclosure is not limited to these specific examples. Since other modifications and changes varied to fit particular operating requirements and environments will be apparent to those skilled in the art, the disclosure is not considered limited to the example chosen for purposes of disclosure, and covers all changes and modifications which do not constitute departures from the true spirit and scope of this disclosure.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A system comprising:
one or more processors; and
one or more computer-readable media storing computer-executable instructions that, when executed, cause the one or more processors to:
receive, from a computing device, input audio data generated by a microphone of the computing device, the input audio data representing speech, the speech including a query;
generate, via speech-recognition processing on the input audio data, first text data corresponding to the speech;
determine, based at least in part on the first text data, intent data associated with the speech;
determine that an intent score associated with the intent data fails to meet a threshold intent score for identifying a first application that is capable of providing an answer to the query;

based at least in part on the intent score failing to meet the threshold intent score, send an indication of the query to a second application that is configured to:
  determine facts associated with an entity referenced in the query; and
  select, as an unsolicited fact, a first fact of the facts based at least in part on a determination that the first fact is more related to the answer than a second fact of the facts;
receive a response to the indication from the second application, the response including the unsolicited fact;
generate first output audio data representing a first message, the first message indicating that the answer to the query is unknown;
generate second output audio data that is to be output with the first output audio data, the second output audio data representing a second message including the unsolicited fact;
send the first output audio data for output via an audio speaker at the computing device; and
send the second output audio data for output via the audio speaker at the computing device.

2. The system as recited in claim 1, wherein the intent score is a highest intent score of multiple intent scores associated with the query, and wherein each one of the multiple intent scores are associated with a respective application.

3. A method comprising:
receiving input audio data representing speech, the input audio data generated by one or more microphones of a computing device;
determining, based at least in part on intent data, that the input audio data comprises a request for information;
determining that the information is unknown based at least in part on an intent score associated with the intent data failing to meet a threshold intent score for a first application that is capable of providing the information;
determining first data indicating that the information is unknown;
based at least in part on the intent score failing to meet the threshold intent score, sending an indication of the request to a second application that is configured to:
  determine facts that are unresponsive to the request but related to an entity referenced in the request; and
  select, as an unsolicited fact, a first fact of the facts based at least in part on a determination that the first fact is more related to an interest of a user of the computing device than a second fact of the facts;
receiving, from the second application, second data indicating the unsolicited fact;
generating output audio data based at least in part on the first data and the second data; and
sending the output audio data for output via one or more audio speakers of the computing device.

4. The method as recited in claim 3, wherein the unsolicited fact comprises content selected by a content source that has requested to output content in association with the entity referenced in the request.

5. The method as recited in claim 3, further comprising determining that the intent score is a highest intent score of multiple intent scores associated with the request, and wherein each one of the multiple intent scores failing to meet threshold intent scores for respective applications that are capable of providing the information.

6. The method as recited in claim 3, further comprising:
receiving an identifier from the computing device;
determining, using the identifier, a profile associated with the computing device; and
storing, in the profile, an indication of a reward provided based at least in part on the output audio data, that at least partly represents the second data, being sent for output on the computing device.

7. The method as recited in claim 3, further comprising generating selection criteria based at least in part on information from a profile associated with the computing device, wherein generating the output audio data is based at least in part on the selection criteria.

8. The method as recited in claim 7, wherein the information from the profile comprises one or more of:
a topic of interest;
a previous purchase;
a search history; or
a geographic location.

9. The method as recited in claim 3, the second application further configured to:
determine a first value offered by a first content source to output the first fact in association with the entity; and
determining a second value offered by a second content source to output the second fact in association with the entity;
wherein selecting the first fact is further based at least in part on a determination that the first value is higher than the second value.

10. A system comprising:
one or more processors; and
one or more computer-readable media storing computer-executable instructions that, when executed, cause the one or more processors to:
  receive, as a user input, a preference to receive unsolicited facts associated with requests;
  receive input audio data generated by one or more microphones and representing speech;
  determine, based at least in part on intent data, that the input audio data comprises a request for information;
  determine that the information is unknown based at least in part on an intent score associated with the intent data failing to meet a threshold intent score for a first application that is capable of providing the information;
  generate first data indicating that the information is unknown;
  based at least in part on the intent score failing to meet the threshold intent score and based at least in part on the preference, send an indication of the request to a second application that is configured to:
    determine one or more facts that are unresponsive to the request but related to an entity referenced in the request; and
    select, as an unsolicited fact, a first fact of the one or more facts based at least in part on one or more selection criteria;
  receive second data from the second application, the second data indicating the unsolicited fact;
  generate, based at least in part on the preference, output audio data representing at least a portion of the first data and the second data; and
  send the output audio data for output via one or more audio speakers.

11. The system as recited in claim 10, wherein the unsolicited fact comprises content selected by a content source that has requested to output content in association with the entity referenced in the request.

12. The system as recited in claim 10, wherein the computer-executable instructions further cause the one or more processors to determine that the intent score is a highest intent score of multiple intent scores associated with the request, and wherein each one of the multiple intent scores failing to meet threshold intent scores for respective applications that are capable of providing the information.

13. The system as recited in claim 10, wherein the receiving the second data from the second application comprises receiving first content selected by a first content source that has requested to output content in association with lithe entity, the unsolicited fact comprises a first unsolicited fact, and the computer-executable instructions further cause the one or more processors to:
   receive third data from the second application, the third data comprising second content selected by a second content source that has requested to output content in association with the entity; and
   select at least one of the second data or the third data, wherein the generating the output audio data is based at least in part on the selecting.

14. The system as recited in claim 13, wherein the computer-executable instructions further cause the one or more processors to:
   determine a first value offered by the first content source to output content in association with the entity;
   determine a second value offered by the second content source to output content in association with the entity; and
   determine that the first value is higher than the second value;
   wherein the selecting the at least one of the second data or the third data comprises selecting the second data based at least in part on the determining that the first value is higher than the second value.

15. The system as recited in claim 10, wherein the computer-executable instructions further cause the one or more processors to:
   receive an identifier from a computing device;
   determine, using the identifier, a profile associated with the computing device; and
   store, in the profile, an indication of a reward provided based at least in part on the output audio data, that at least partly represents the second data, being sent for output via the one or more audio speakers.

16. The system as recited in claim 10, wherein the computer-executable instructions, when executed, further cause the one or more processors to receive demographic information associated with a user profile, wherein receiving the second data indicating the unsolicited fact is based at least in part on the demographic information.

17. The system as recited in claim 10, wherein the computer-executable instructions, when executed, further cause the one or more processors to receive information indicating a network latency, wherein sending the indication of the request to the second application is based at least partly on a determination that the network latency meets or exceeds a threshold network latency.

18. The system as recited in claim 10, wherein the computer-executable instructions, when executed, further cause the one or more processors to receive information associated with a user profile, and wherein the entity comprises a person or a place and the user profile includes a preference for receiving unsolicited facts associated with the person or the place.

19. The system as recited in claim 10, wherein:
   the sending the indication of the request to the second application comprises sending, to an event bus that is readable by one or more applications, an indication of the entity referenced in the request; and
   the unsolicited fact comprises a first unsolicited fact of one or more unsolicited facts that are associated with the entity and stored by the second application.

20. The system as recited in claim 10, wherein the computer-executable instructions, when executed, further cause the one or more processors to generate the selection criteria based at least in part on information obtained from a profile, the information comprising at least one of a topic of interest, a previous purchase, a search history, or a geographic location, and wherein the indication sent to the second application includes the selection criteria.

\* \* \* \* \*